(12) United States Patent
Yu

(10) Patent No.: US 10,680,950 B2
(45) Date of Patent: Jun. 9, 2020

(54) ROUTE SEARCHING METHOD AND APPARATUS, ALLOCATION NODE, SEARCHING NODE, AND INGRESS NODE

(71) Applicant: HUAWEI TECHNOLOGIES CO., LTD., Shenzhen, Guangdong (CN)

(72) Inventor: Jingzhou Yu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 25 days.

(21) Appl. No.: 16/180,722

(22) Filed: Nov. 5, 2018

(65) Prior Publication Data

US 2019/0075053 A1   Mar. 7, 2019

Related U.S. Application Data

(63) Continuation of application No. PCT/CN2017/077099, filed on Mar. 17, 2017.

(30) Foreign Application Priority Data

May 6, 2016 (CN) .......................... 2016 1 0298938

(51) Int. Cl.
  *H04L 12/745* (2013.01)
  *H04L 29/12* (2006.01)
  *H04L 12/753* (2013.01)
(52) U.S. Cl.
  CPC ........ *H04L 45/748* (2013.01); *H04L 61/2007* (2013.01); *H04L 45/48* (2013.01)
(58) Field of Classification Search
  CPC .... H04L 45/748; H04L 45/48; H04L 61/2007
  See application file for complete search history.

(56) References Cited

U.S. PATENT DOCUMENTS

2003/0236793 A1* 12/2003 Karlsson ............. G06F 16/9027
2005/0083937 A1*  4/2005 Lim ........................ H04L 45/08
                                                          370/392

(Continued)

FOREIGN PATENT DOCUMENTS

CN     101588299 B     1/2012
CN     102763380 A    10/2012

(Continued)

OTHER PUBLICATIONS

From the book "High Performance Switches and Routers"; Chao et al.; Wiley Publishing; Jan. 1, 2007; Chapter 2—"IP Address Lookup"; pp. 25-76 (52 pages). (Year: 2007).*
"Next Hop Storage and Retrieval for Coded and Scalar IP Prefix Trees"; 2011 International Symposium on Computer Networks and Distributed Systems (CNDS), Feb. 23-24, 2011; Alaei et al. (Year: 2011).*

(Continued)

*Primary Examiner* — Benjamin H Elliott, IV
(74) *Attorney, Agent, or Firm* — Fish & Richardson P.C.

(57) ABSTRACT

A route searching method and apparatus, an allocation node, a searching node, and an ingress node are provided. The method includes: receiving, by an allocation node, a destination IP address of a packet sent by an ingress node, where an allocation table on the allocation node includes a match item field and a searching node number field; performing, by the allocation node, matching of the match item field in the allocation table according to the destination IP address in an LPM principle; if the destination IP address successfully matches a first match item field in the allocation table, obtaining, by the allocation node, a physical box number of a first searching node on which routing information of a first prefix subtree corresponding to the first match item field is located; and sending, by the allocation node, the destination IP address to the first searching node.

20 Claims, 8 Drawing Sheets

(56) References Cited

U.S. PATENT DOCUMENTS

| | | | | |
|---|---|---|---|---|
| 2013/0010796 A1* | 1/2013 | Judge | ................... | H04L 45/04 |
| | | | | 370/392 |
| 2014/0036918 A1* | 2/2014 | Varvello | ............... | H04L 45/306 |
| | | | | 370/392 |
| 2015/0098470 A1* | 4/2015 | Sun | ................... | H04L 45/748 |
| | | | | 370/392 |
| 2015/0312144 A1* | 10/2015 | Gobriel | ............... | H04L 45/7453 |
| | | | | 709/242 |
| 2017/0366459 A1* | 12/2017 | Kfir | ................... | H04L 45/748 |
| 2018/0019943 A1* | 1/2018 | Gobriel | ............... | H04L 45/7453 |
| 2019/0075053 A1* | 3/2019 | Yu | ................... | H04L 61/2007 |

FOREIGN PATENT DOCUMENTS

| | | |
|---|---|---|
| CN | 103581023 A | 2/2014 |
| CN | 104158743 A | 11/2014 |
| CN | 105049359 A | 11/2015 |
| CN | 105227468 A | 1/2016 |

OTHER PUBLICATIONS

Extended European Search Report issued in European Application No. 17792386.9 dated Mar. 20, 2019, 8 pages.

Minlan Yu et al, Scalable Flow-Based Networking with DIFANE. SIGCOMM'10, Aug. 30-Sep. 3, 2010, 12 pages.

International Search Report and Written Opinion issued in International Application No. PCT/CN2017/077099 dated Jun. 4, 2017, 20 pages.

* cited by examiner

ROUTE SEARCHING METHOD AND APPARATUS, ALLOCATION NODE, SEARCHING NODE, AND INGRESS NODE

CROSS-REFERENCE TO RELATED APPLICATIONS

This application is a continuation of International Application No. PCT/CN2017/077099, filed on Mar. 17, 2017, which claims priority to Chinese Patent Application No. 201610298938.5, filed on May 6, 2016, The disclosures of the aforementioned applications are hereby incorporated by reference in their entireties.

TECHNICAL FIELD

The present invention relates to the field of communications technology, and in particular, to a route searching method and apparatus, an allocation node, a searching node, and an ingress node.

BACKGROUND

A main task of a router is forwarding a internet protocol (IP) packet, that is, forwarding a packet that arrives at a router input port to a correct egress port according to a destination IP address in a packet header. Route searching is a process of searching a routing table in a router according to a destination IP address of a packet to obtain egress port information of the packet.

With network development, a requirement of a router throughput gradually increases. In the prior art, a method for increasing a router throughput is scaling out (Scale Out), that is, an entire router is constructed by using a plurality of boxes that are stacked. Performance is improved mainly by increasing a quantity of boxes, and a scale effect is easily implemented, so that costs are reduced.

The following describes a scaled-out distributed router and a route searching method in the prior art. The distributed router includes an ingress computing node, a bounce computing node, and an egress computing node. Further, the distributed router may further include another computing node. The ingress computing node receives a network packet, and determines a bounce computing node to which the received network packet is routed. Specifically, the ingress computing node generates a hash key based on a received destination IP address, and hash ciphers are corresponding to different computing nodes (for example, bounce computing nodes) of the distributed router. In this way, after determining a specific bounce computing node, the ingress computing node sends the network packet to the determined bounce computing node without route searching. The bounce computing node determines, based on the destination IP address, a location to which the network packet is routed. Specifically, the bounce computing nodes store different routing entry sets (for example, subsets or parts). The bounce computing node determines a specific egress computing node by using which the network packet leaves from the distributed router.

In the route searching method, routing tables are stored in a distributed manner by using the hash key generated based on the destination IP address, and consequently, a large quantity of routing entries are repeated. In addition, because distributed route searching is performed based on the hash key, a hash (Hash) conflict occurs, an extra mechanism is required to resolve the hash conflict, and a false hit is caused. As a result, entire routing efficiency is relatively low.

SUMMARY

Embodiments of the present invention provide a route searching method and apparatus, an allocation node, a searching node, and an ingress node, to resolve a prior-art technical problem that route mechanism efficiency of a distributed router is relatively low.

According to a first aspect, an embodiment of the present invention provides a route searching method, including:

receiving, by an allocation node of a packet forwarding device, a destination internet protocol IP address of a packet sent by an ingress node of the packet forwarding device, where the allocation node stores an allocation table, an allocation table entry of the allocation table includes a match item field and a searching node number field, the match item field is a prefix corresponding to a root node of a prefix subtree, and the searching node number field is a physical box number of a searching node on which routing information of the prefix subtree is located; performing, by the allocation node, matching of the match item field in the allocation table according to the destination IP address in a longest prefix match LPM principle; if the destination IP address successfully matches a first match item field in the allocation table, obtaining, by the allocation node, a physical box number of a first searching node on which routing information of a first prefix subtree corresponding to the first match item field is located, where the first searching node is a searching node of the packet forwarding device; and sending, by the allocation node, the destination IP address to the first searching node, where the first searching node stores a routing table, a routing table entry of the routing table includes a prefix field and an egress port field, the prefix field is a proper prefix in the first prefix subtree, the egress port field is a physical box number of an egress node and an egress port number, and the egress node is an egress node of the packet forwarding device.

In the solutions in this embodiment of the present invention, routing tables are stored on different searching nodes in a distributed manner. Therefore, the routing tables may be distributed more evenly, and pressure of a single node from a routing table specification may be reduced. Further, both the allocation node and the searching node use an LPM matching principle during matching. Therefore, when the searching node is allocated, no conflict occurs, and no fault hit occurs. Therefore, entire route searching efficiency is relatively high.

With reference to the first aspect, in a first possible implementation of the first aspect, the receiving, by an allocation node, a destination IP address includes: receiving, by the allocation node, the packet sent by the ingress node.

With reference to the first aspect, in a second possible implementation of the first aspect, the receiving, by an allocation node, a destination IP address includes: receiving, by the allocation node, a control message sent by the ingress node, where the control message includes the destination IP address, an identifier ID of the packet, and a physical box number of the ingress node; and correspondingly, the method further includes: sending, by the allocation node, the ID and the physical box number of the ingress node to the first searching node. By using the method, an exchange plane and a searching plane are decoupled, and interconnection load and exchange congestion of the searching plane are reduced.

With reference to the first aspect, or the first possible implementation of the first aspect, or the second possible implementation of the first aspect, in a third possible implementation of the first aspect, the allocation table entry of the allocation table further includes a field indicating whether there is a default route flag bit and a default route field, the field indicating whether there is a default route flag bit indicates whether the prefix subtree has a default route, the default route is a default route of the prefix subtree, and the default route is a longest match prefix before the root node and routing information corresponding to the longest match prefix; and the method further includes: if the destination IP address successfully matches the first match item field in the allocation table, sending, by the allocation node to the first searching node, a first flag bit that indicates whether there is a default route and that is corresponding to the first match item field, and when the first flag bit that indicates whether there is a default route is yes, sending, by a first allocation node to the first searching node, a first default route corresponding to the first match item field.

With reference to any one of the first aspect or the first possible implementation of the first aspect to the third possible implementation of the first aspect, in a fourth possible implementation of the first aspect, the method further includes:

receiving, by the allocation node, an allocation table entry delivered by a controller of the packet forwarding device; and updating, by the allocation node, the allocation table according to the received allocation table entry.

With reference to the first aspect, or the first possible implementation of the first aspect, or the second possible implementation of the first aspect, in a fifth possible implementation of the first aspect, the allocation table entry of the allocation table further includes a field indicating whether there is a default route flag bit and a default route field, the field indicating whether there is a default route flag bit indicates whether the prefix subtree has a default route, the default route is a default route of the prefix subtree, and the default route is a longest match prefix before the root node and routing information corresponding to the longest match prefix; and the method further includes: receiving, by the allocation node, a default route delivered by a controller of the packet forwarding device, where the delivered default route is a default route of the first prefix subtree; and filling, by the allocation node, the delivered default route into a first default route field corresponding to the first match item field, and setting, as yes, a first flag bit that indicates whether there is a default route and that is corresponding to the first match item field.

According to a second aspect, an embodiment of the present invention provides a route searching method, including:

receiving, by a first searching node of a packet forwarding device, a destination internet protocol IP address of a packet sent by an allocation node of the packet forwarding device, where the allocation node stores an allocation table, an allocation table entry of the allocation table includes a match item field and a searching node number field, the match item field is a prefix corresponding to a root node of a prefix subtree, the searching node number field is a physical box number of a searching node on which routing information of the prefix subtree is located, the first searching node is a searching node on which routing information of a first prefix subtree in the prefix subtree is located, the first searching node stores a routing table, a routing table entry of the routing table includes a prefix field and an egress port field, the prefix field is a prefix in the first prefix subtree, the egress port field is a physical box number of an egress node and an egress port number, and the egress node is an egress node of the packet forwarding device; performing, by the first searching node, matching of the prefix field in the routing table according to the destination IP address in the LPM principle; and performing, by the first searching node according to a matching result, an operation corresponding to the matching result.

With reference to the second aspect, in a first possible implementation of the second aspect, the receiving, by a first searching node, a destination IP address includes: receiving, by the first searching node, the packet sent by the allocation node; and correspondingly, the performing, by the first searching node according to a matching result, an operation corresponding to the matching result includes: if the matching result is that the destination IP address successfully matches a first prefix field in the routing table, sending, by the first searching node to a first egress node corresponding to the first prefix field, the packet and a first egress port number corresponding to the first prefix field.

With reference to the second aspect, in a second possible implementation of the second aspect, the method further includes:

receiving, by the first searching node, an identifier ID of the packet sent by the allocation node and a physical box number of an ingress node of the packet forwarding device, where the ingress node is an ingress node by using which the packet is received from an external network; and correspondingly, the performing, by the first searching node according to a matching result, an operation corresponding to the matching result includes: if the matching result is that the destination IP address successfully matches a first prefix field in the routing table, processing, by the first searching node, the ID, a physical box number of a first egress node corresponding to the first prefix field, and a first egress port as a first instruction message; and sending, by the first searching node, the first instruction message to the ingress node.

With reference to the second possible implementation of the second aspect, in a third possible implementation of the second aspect, the first instruction message further includes an editing instruction, and the editing instruction is used to instruct the ingress node to edit the packet.

With reference to the second aspect, in a fourth possible implementation of the second aspect, the method further includes:

receiving, by the first searching node, an identifier ID of the packet sent by the allocation node and a physical box number of an ingress node of the packet forwarding device, where the ingress node is an ingress node by using which the packet is received from an external network; and correspondingly, the performing, by the first searching node according to a matching result, an operation corresponding to the matching result includes: if the matching result is that the destination IP address successfully matches a first prefix field in the routing table, processing, by the first searching node, the ID and a first egress port that is corresponding to the first prefix field as a second instruction message; and sending, by the first searching node, the second instruction message and the physical box number of the ingress node to a first egress node corresponding to the first prefix field.

With reference to the fourth possible implementation of the second aspect, in a fifth possible implementation of the second aspect, the second instruction message further includes an editing instruction, and the editing instruction is used to instruct the first egress node to edit the packet.

With reference to the second aspect, in a sixth possible implementation of the second aspect, the allocation table entry of the allocation table further includes a field indicating whether there is a default route flag bit and a default route field, the field indicating whether there is a default route flag bit indicates whether the prefix subtree has a default route, the default route is a default route of the prefix subtree, and the default route is a longest match prefix before the root node and routing information corresponding to the longest match prefix; and the method further includes: receiving, by the first searching node, a first flag bit that indicates whether there is a default route, that is corresponding to the first prefix subtree, and that is sent by the first allocation node, and when the first flag bit that indicates whether there is a default route is yes, receiving, by the first searching node, a first default route that is of the first prefix subtree and that is sent by the first allocation node; and correspondingly, the performing, by the first searching node according to a matching result, an operation corresponding to the matching result includes: if the matching result is that the destination IP address does not successfully match a first prefix field in the routing table, determining, by the first searching node, whether the first flag bit that indicates whether there is a default route is yes; if the first flag bit that indicates whether there is a default route is yes, obtaining, by the first searching node, the first default route; and obtaining, by the first searching node, a second egress port and a physical box number of a second egress node corresponding to the first default route.

With reference to any one of the second aspect, or the first possible implementation of the second aspect to the sixth possible implementation of the second aspect, in a seventh possible implementation of the second aspect, the method further includes: receiving, by the first searching node, a routing table entry sent by a controller of the packet forwarding device; and updating, by the first searching node, the routing table according to the received routing table entry.

With reference to the second aspect, in an eighth possible implementation of the second aspect, the method further includes:

receiving, by the first searching node, a default route that is of the first prefix subtree and that is delivered by a controller of the packet forwarding device, where the default route is a longest match prefix before a root node of the first prefix subtree and routing information corresponding to the longest match prefix; and updating, by the first searching node, the routing table with the default route of the first prefix subtree.

According to a third aspect, an embodiment of the present invention provides a route searching method, including:

receiving, by an ingress node of a packet forwarding device, a packet; processing, by the ingress node, an identifier ID of the packet, a destination internet protocol IP address of the packet, and a physical box number of the ingress node as a control message; sending, by the ingress node, the control message to a first allocation node in at least one allocation node of the packet forwarding device, where the at least one allocation node stores a same allocation table, an allocation table entry of the allocation table includes a match item field and a searching node number field, the match item field is a prefix corresponding to a root node of a prefix subtree, and the searching node number field is a physical box number of a searching node on which routing information of the prefix subtree is located; receiving, by the ingress node, a first instruction message sent by a first searching node in at least one searching node of the packet forwarding device, where the first instruction message includes the ID, a physical box number of a first egress node, and a first egress port, the first searching node is a searching node on which routing information of a first prefix subtree in the prefix subtree is located, the first searching node stores a routing table, a routing table entry of the routing table includes a prefix field and an egress port field, the prefix field is a prefix in the first prefix subtree, and the egress port field is a physical box number of an egress node and an egress port number; and obtaining, by the ingress node, the packet according to the ID, and sending the packet and the first egress port to the first egress node. By using the method, an exchange plane and a searching plane are decoupled, and interconnection load and exchange congestion of the searching plane are reduced.

With reference to the third aspect, in a first possible implementation of the third aspect, the method further includes: locally storing, by the ingress node, the packet, where the ID represents a storage address of the packet.

With reference to the third aspect or the first possible implementation of the third aspect, in a second possible implementation of the third aspect, before the sending, by the ingress node, the control message to a first allocation node in at least one allocation node of the packet forwarding device, the method further includes: performing, by the ingress node, matching in a hotspot routing table according to the destination IP address, and determining that the matching does not succeed, where a routing table entry of the hotspot routing table includes a prefix field and an egress port field, and the egress port field includes a physical box number of an egress node and an egress port. By using the method, the packet may be quickly forwarded, and load of the allocation node and load of the searching node may be reduced.

With reference to the third aspect, or the first possible implementation of the third aspect, or the second possible implementation of the third aspect, in a third possible implementation of the third aspect, the first instruction message further includes an editing instruction, and the method further includes: before the packet is sent to the first egress node, editing the packet according to the editing instruction.

According to a fourth aspect, an embodiment of the present invention provides a route searching apparatus. Specifically, the apparatus may be an allocation node. The apparatus has functions for implementing the allocation node in the foregoing method design. These functions may be implemented by hardware, or may be implemented by hardware by executing corresponding software. The hardware or the software includes one or more units corresponding to the foregoing functions.

In a possible design, a specific structure of the route searching apparatus that is used as the allocation node may include a receiving unit, a processing unit, and a sending unit. The receiving unit, the processing unit, and the sending unit may execute corresponding functions in the foregoing method.

According to a fifth aspect, an embodiment of the present invention provides a route searching apparatus. Specifically, the apparatus may be a searching node. The apparatus has functions for implementing the searching node in the foregoing method design. These functions may be implemented by hardware, or may be implemented by hardware by executing corresponding software. The hardware or the software includes one or more units corresponding to the foregoing functions.

In a possible design, a specific structure of the route searching apparatus that is used as the searching node may include a receiving unit, a processing unit, and a sending unit. The receiving unit, the processing unit, and the sending unit may execute corresponding functions in the foregoing method.

According to a sixth aspect, an embodiment of the present invention provides a route searching apparatus. Specifically, the apparatus may be an ingress node. The apparatus has functions for implementing the ingress node in the foregoing method design. These functions may be implemented by hardware, or may be implemented by hardware by executing corresponding software. The hardware or the software includes one or more units corresponding to the foregoing functions.

In a possible design, a specific structure of the route searching apparatus that is used as the ingress node may include a receiving unit and a processing unit. The receiving unit and the processing unit may execute corresponding functions in the foregoing method.

According to a seventh aspect, an embodiment of the present invention provides an allocation node. The allocation node includes a receiver, a transmitter, and a processor. The receiver, the transmitter, and the processor are configured to execute the method executed by the foregoing allocation node.

According to an eighth aspect, an embodiment of the present invention provides a searching node. The searching node includes a receiver, a transmitter, and a processor. The receiver, the transmitter, and the processor are configured to execute the method executed by the foregoing searching node.

According to a ninth aspect, an embodiment of the present invention provides an ingress node. The allocation node includes a receiver, a transmitter, and a processor. The receiver, the transmitter, and the processor are configured to execute the method executed by the foregoing ingress node.

According to a tenth aspect, an embodiment of the present invention provides a method for configuring a routing table entry, including:

receiving, by a controller of a packet forwarding device, a protocol packet reported by an ingress node of the packet forwarding device, and processing the protocol packet, to obtain a prefix, a physical box number of an egress node, and an egress port that are in a routing table entry, where the egress node is an egress node of the packet forwarding device; grouping, by the controller, the prefix into a prefix subtree in a prefix tree; if the prefix subtree is a newly established subtree, allocating, by the controller, a searching node to the routing table entry, and delivering the routing table entry to the searching node, where the searching node is a searching node of the packet forwarding device; generating, by the controller, an allocation table entry, where the allocation table entry includes a match item field and a searching node number field, the match item field is a prefix corresponding to a root node of the prefix subtree, and the searching node number is a physical box number of the searching node; and delivering, by the controller, the allocation table entry to all allocation nodes of the packet forwarding device.

With reference to the tenth aspect, in a first possible implementation of the tenth aspect, the allocation table entry further includes a field indicating whether there is a default route flag bit and a default route field, the field indicating whether there is a default route flag bit indicates whether the prefix subtree has a default route, the default route is a default route of the prefix subtree, and the default route is a longest match prefix before the root node and routing information corresponding to the longest match prefix.

With reference to the tenth aspect, in a second possible implementation of the tenth aspect, the method further includes:

determining, by the controller, whether there is a prefix before the root node; and if there is a prefix before the root node, delivering, by the controller to the searching node, a longest match prefix before the root node and routing information corresponding to the longest match prefix that are used as a default route of the prefix subtree.

With reference to the tenth aspect, in a third possible implementation of the tenth aspect, the method further includes: if the prefix subtree already exists, delivering, by the controller, the routing table entry to a searching node corresponding to the prefix subtree.

With reference to the first possible implementation of the tenth aspect, in a fourth possible implementation of the tenth aspect, the method further includes: if the prefix and routing information corresponding to the prefix are a default route of another subtree, updating, by the controller, a default route field and a field indicating whether there is a default route that are of the another prefix subtree and that are on all the allocation nodes.

With reference to the tenth aspect or the third possible implementation of the tenth aspect, in a fifth possible implementation of the tenth aspect, the method further includes:

if the prefix and routing information corresponding to the prefix are a default route of another subtree, delivering, by the controller to a searching node corresponding to the another prefix subtree, the prefix and the routing information corresponding to the prefix.

According to an eleventh aspect, an embodiment of the present invention provides an apparatus for configuring a routing table entry. Specifically, the apparatus may be a controller. The apparatus has functions for implementing the controller in the foregoing method design. These functions may be implemented by hardware, or may be implemented by hardware by executing corresponding software. The hardware or the software includes one or more units corresponding to the foregoing functions.

In a possible design, a specific structure of the apparatus that is for configuring a routing table entry and that is used as the controller may include a receiving unit, a processing unit, and a sending unit. The receiving unit, the processing unit, and the sending unit may execute corresponding functions in the foregoing method.

According to a twelfth aspect, an embodiment of the present invention provides a controller. The controller includes a receiver, a transmitter, and a processor. The receiver, the transmitter, and the processor are configured to execute the method executed by the foregoing controller.

According to a thirteenth aspect, an embodiment of the present invention provides a computer storage medium that is configured to store a computer software instruction used for the method described in any of the first aspect, the second aspect, the third aspect, or the tenth aspect, or used for the route searching apparatus described in the fourth aspect to the sixth aspect, and that includes the designed program used to execute the foregoing aspects.

According to a fourteenth aspect, an embodiment of the present invention provides a packet forwarding device, including an ingress node, an allocation node, a searching node, an egress node, and a controller, where the ingress node is configured to: receive a packet, and send a destination internet protocol IP address of the packet to a first allocation node in at least one allocation node of the packet forwarding device, where the at least one allocation node stores a same allocation table, the allocation table includes a match item field and a searching node number field, the match item field is a prefix corresponding to a root node of a prefix subtree, and the searching node number field is a physical box number of a searching node on which routing information of the prefix subtree is located;

the first allocation node is configured to: perform matching of the match item field in the allocation table according to the destination IP address in a longest prefix match LPM principle; if the destination IP address successfully matches a first match item field in the allocation table, obtain a physical box number of a first searching node on which routing information of a first prefix subtree corresponding to the first match item field is located; and send the destination IP address to the first searching node, where the first searching node stores a routing table, the routing table includes a prefix field and an egress port field, the prefix field is a prefix in the first prefix subtree, and the egress port field is a physical box number of an egress node and an egress port number; and the first searching node is configured to: perform matching of the prefix field in the routing table according to the destination IP address in the LPM principle, and perform, according to a matching result, an operation corresponding to the matching result.

With reference to the fourteenth aspect, in a first possible implementation of the fourteenth aspect, the ingress node is configured to send the packet to the first allocation node.

With reference to the first possible implementation of the fourteenth aspect, in a second possible implementation of the fourteenth aspect, the first searching node is configured to: if the matching result is that the destination IP address successfully matches a first prefix field in the routing table, send, to a first egress node corresponding to the first prefix field, the packet and a first egress port number corresponding to the first prefix field; and the first egress node is configured to send the packet by using the first egress port.

With reference to the fourteenth aspect, in a third possible implementation of the fourteenth aspect, the ingress node is further configured to: before the ingress node sends the destination IP address of the packet to the first allocation node, extract the destination IP address of the packet, process the destination IP address, an identifier ID of the packet, and a physical box number of the ingress node as a control message, and send the control message to the first allocation node.

With reference to the third possible implementation of the fourteenth aspect, in a fourth possible implementation of the fourteenth aspect, the first allocation node is further configured to send the ID and the physical box number of the ingress node to the first searching node, and the first searching node is configured to: if the matching result is that the destination IP address successfully matches a first prefix field in the routing table, process the ID, a physical box number of a first egress node corresponding to the first prefix field, and a first egress port as a first instruction message, and send the first instruction message to the ingress node;

the ingress node is further configured to: obtain the packet according to the ID, and send the packet and the first egress port to the first egress node; and the first egress node is further configured to send the packet by using the first egress port.

With reference to the third possible implementation of the fourteenth aspect, in a fifth possible implementation of the fourteenth aspect, the first searching node is configured to: if the matching result is that the destination IP address successfully matches a first prefix field in the routing table, process the ID and a first egress port that is corresponding to the first prefix field as a second instruction message, and send the second instruction message and the physical box number of the ingress node to a first egress node corresponding to the first prefix field; the first egress node is further configured to send a request message to the ingress node, where the request message includes the ID; the ingress node is further configured to: obtain the packet according to the ID, and send the packet to the first egress node; and the first egress node is further configured to: receive the packet, and send the packet by using the first egress port.

With reference to the third possible implementation of the fourteenth aspect, or the fourth possible implementation of the fourteenth aspect, or the fifth possible implementation of the fourteenth aspect, in a sixth possible implementation of the fourteenth aspect, the ID is used to represent a storage location of the packet on the ingress node.

With reference to the fourteenth aspect, or the first possible implementation of the fourteenth aspect, or the third possible implementation of the fourteenth aspect, in a sixth possible implementation of the fourteenth aspect, the allocation table further includes a field indicating whether there is a default route flag bit and a default route field, the field indicating whether there is a default route flag bit indicates whether the prefix subtree has a default route, the default route is a default route of the prefix subtree, and the default route is a longest match prefix before the root node and routing information corresponding to the longest match prefix; and the first allocation node is further configured to: if the destination IP address successfully matches the first match item field in the allocation table, send, to the first searching node, a first flag bit that indicates whether there is a default route and that is corresponding to the first match item field, and when the first flag bit that indicates whether there is a default route is yes, send, to the first searching node, a first default route corresponding to the first match item field; and correspondingly, the first searching node is configured to: if the matching result is that the destination IP address does not successfully match a first prefix field in the routing table, determine whether the first flag bit that indicates whether there is a default route is yes; if the first flag bit that indicates whether there is a default route is yes, obtain the first default route; and obtain a second egress port and a physical box number of a second egress node corresponding to the first default route.

With reference to any one of the fourteenth aspect, or the first possible implementation of the fourteenth aspect to the sixth possible implementation of the fourteenth aspect, in a seventh possible implementation of the fourteenth aspect, the controller is configured to: receive a protocol packet reported by the ingress node, and process the protocol packet to obtain a prefix, a physical box number of an egress node, and an egress port that are in a routing table entry; group the prefix in the routing table entry into a second prefix subtree in a prefix tree; and if the second prefix subtree is a newly established subtree, allocate a searching node to the routing table entry; the controller is further configured to: deliver the routing table entry to the allocated searching node, and generate a new allocation table entry, where the allocation table entry includes a match item field and a searching node number field, the match item field is a prefix corresponding to a root node of the second prefix subtree, and the searching node number is a physical box number of the allocated searching node; and the controller is further configured to deliver the allocation table entry to the at least one allocation node.

With reference to the seventh possible implementation of the fourteenth aspect, in an eighth possible implementation of the fourteenth aspect, the allocation table entry further includes a field indicating whether there is a default route flag bit and a default route field, the field indicating whether there is a default route flag bit indicates whether the second prefix subtree has a default route, the default route is a default route of the second prefix subtree, and the default route is a longest match prefix before the root node of the second prefix subtree and routing information corresponding to the longest match prefix.

With reference to the seventh possible implementation of the fourteenth aspect, in a ninth possible implementation of the fourteenth aspect, the controller is further configured to: determine whether there is a prefix before the root node of the second prefix subtree, and if there is a prefix before the root node of the second prefix subtree, deliver, to the searching node, a longest match prefix before the root node of the second prefix subtree and routing information corresponding to the longest match prefix that are as a default route of the second prefix subtree.

With reference to the seventh possible implementation of the fourteenth aspect, in a tenth possible implementation of the fourteenth aspect, if the second prefix subtree already exists, the controller is further configured to deliver the routing table entry to a searching node corresponding to the second prefix subtree.

With reference to the ninth possible implementation of the fourteenth aspect, in an eleventh possible implementation of the fourteenth aspect, if the prefix and routing information corresponding to the prefix are a default route of another subtree, the controller updates a default route field and a field indicating whether there is a default route that are of the another prefix subtree and that are on all the allocation nodes.

With reference to the eighth possible implementation of the fourteenth aspect or the tenth possible implementation of the fourteenth aspect, in a twelfth possible implementation of the fourteenth aspect, if the prefix and routing information corresponding to the prefix are a default route of another subtree, the controller is further configured to deliver, to a searching node corresponding to the another prefix subtree, the prefix and the routing information corresponding to the prefix.

DESCRIPTION OF EMBODIMENTS

Embodiments of the present invention provide a route searching method and apparatus, an allocation node, a searching node, and an ingress node, to resolve a prior-art technical problem that route mechanism efficiency of a distributed router is relatively low.

The following describes in detail implementation processes and objectives of solutions in the embodiments of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1A:
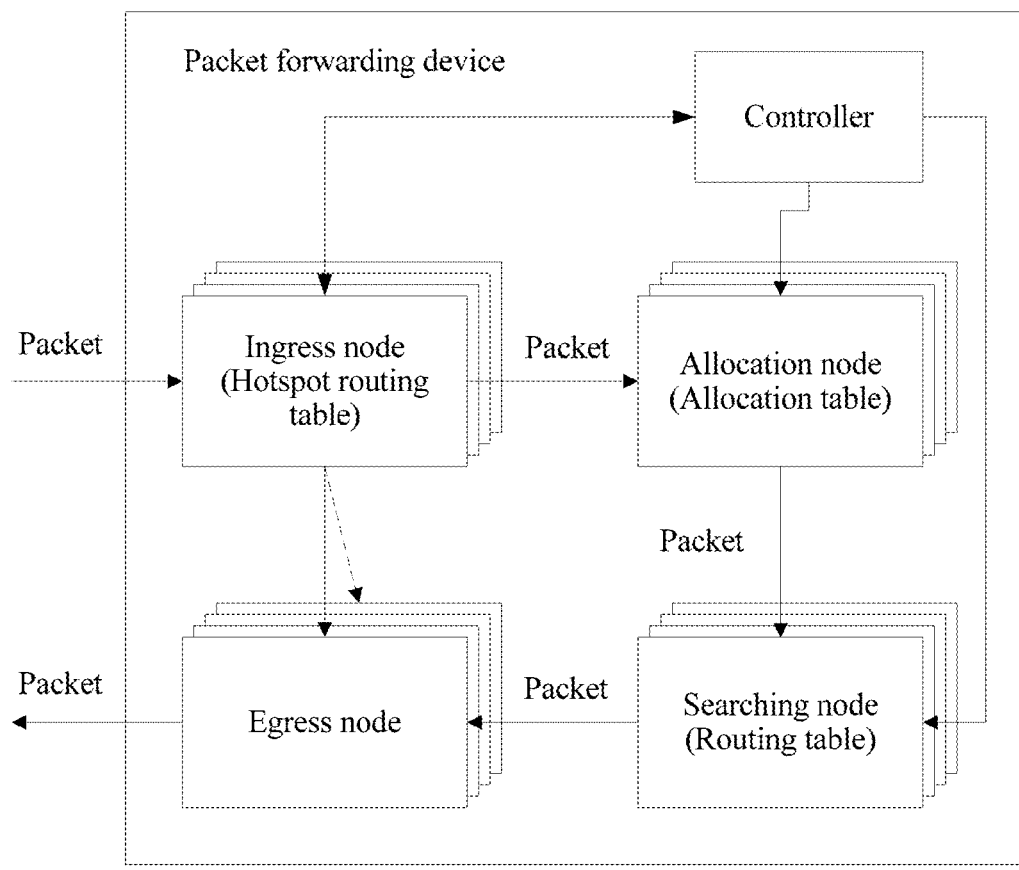
FIG. 1a and FIG. 1b are structural diagrams of a packet forwarding device according to an embodiment of the present invention.
Figure 1B:
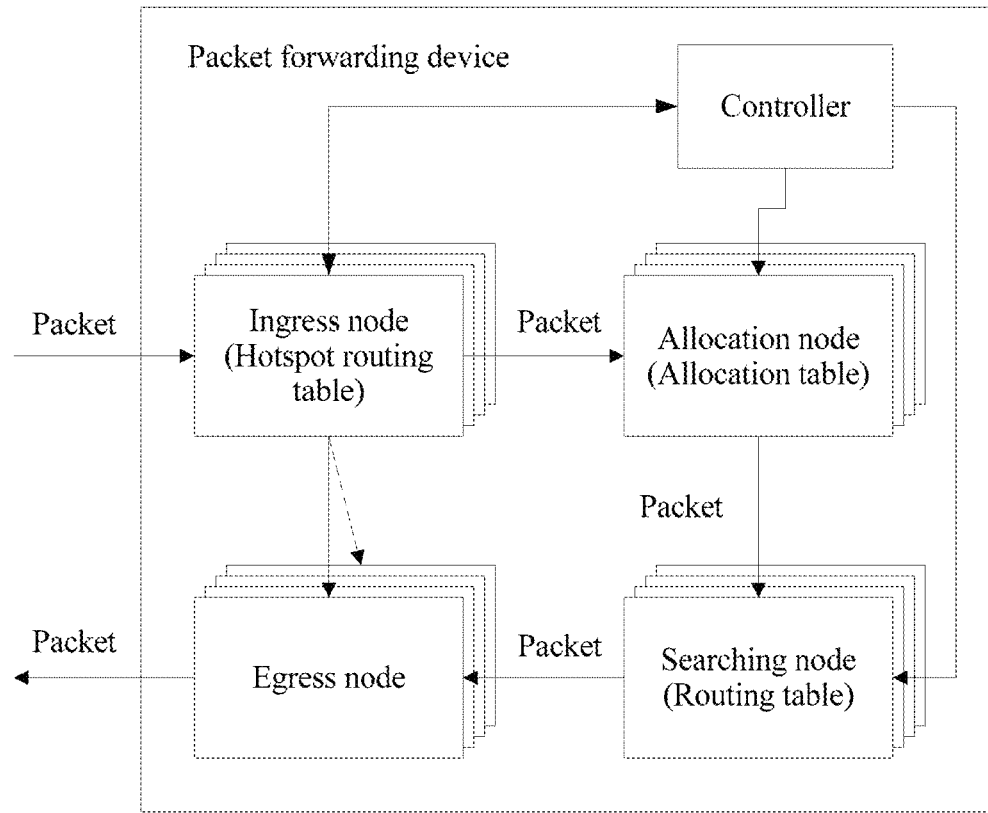

To help describe a route searching method in the embodiments of the present invention, the following first describes a packet forwarding device. The route searching method in the embodiments of the present invention may be applied to the packet forwarding device. Referring to FIG. 1a and FIG. 1b, FIG. 1a and FIG. 1b are structural diagrams of a possible packet forwarding device according to an embodiment of the present invention. As shown in FIG. 1a and FIG. 1b, the packet forwarding device includes a controller, at least one ingress node, at least one allocation node, at least one searching node, and at least one egress node. In actual application, a physical box may include only one node, or may be a set of a plurality of nodes. For example, a physical box may include both an ingress node and an allocation node. A physical box may include both an ingress node and a searching node. A physical box may include both an ingress node and an egress node. A physical box may include both an allocation node and a searching node. A physical box may include both a searching node and an egress node. A physical box may include all of an ingress node, an allocation node, and a searching node. A physical box may include all of an ingress node, an allocation node, and an egress node. A physical box may include all of an ingress node, a searching node, and an egress node. A physical box may include all of an allocation node, a searching node, and an egress node. A physical box may include all of an ingress node, an allocation node, a searching node, and an egress node. The controller and each node may be separately disposed, or the controller and any node may be disposed in a same physical box. These physical boxes are stacked to obtain an entire system of a router. Certainly, in actual application, these physical boxes may be distributed in different areas and manufactured by different manufacturers.

In a structure shown in FIG. 1a, a packet is transmitted between nodes. For example, an ingress node receives a packet, and then sends the packet to any allocation node. After performing searching, the allocation node transmits the packet to a found searching node. After determining an egress node of the packet, the searching node transmits the packet to the determined egress node. Then, the egress node forwards the packet to another network element.

In a structure shown in FIG. 1b, a difference from the structure shown in FIG. 1a lies in that searching and exchange are decoupled, that is, an ingress node and an egress node form an exchange plane, and the ingress node can transmit a packet to the egress node. An allocation node and a searching node form a searching plane. After receiving a packet, the ingress node may not send the entire packet to the allocation node, but sends a destination IP address of the packet to the allocation node. Similarly, after determining the egress node, the searching node sends a determined result and the destination IP address of the packet to the ingress node or the egress node.

It should be understood that only a possible packet forwarding device is shown in the structures shown in FIG. 1a and FIG. 1b. However, the present invention is not limited thereto. The packet forwarding device may further include another component. This is not limited in this embodiment of the present invention.

Figure 2:
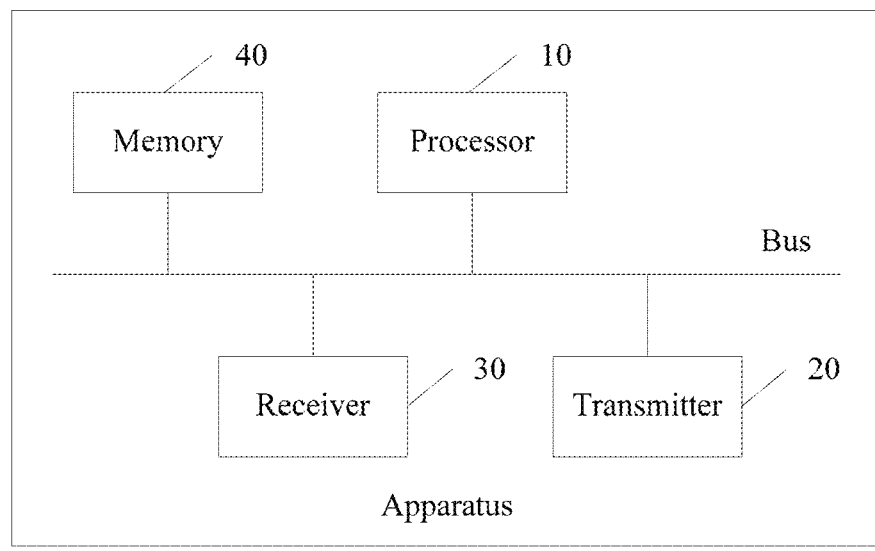
FIG. 2 is a structural diagram of an apparatus according to an embodiment of the present invention.

Next, referring to FIG. 2, FIG. 2 is a possible structural diagram of an apparatus according to an embodiment of the present invention. The apparatus is, for example, the ingress node, the allocation node, the searching node, the egress node, or the controller described above. As shown in FIG. 2, the apparatus includes a processor 10, a transmitter 20, a receiver 30, and a memory 40. The memory 40, the transmitter 20, the receiver 30, and the processor 10 may be connected by using a bus. Certainly, in actual application, the memory 40, the transmitter 20, the receiver 30, and the processor 10 may not be of a bus structure, but may be of another structure such as a star-shaped structure. This is not specifically limited in this application.

Optionally, the processor 10 may be specifically a general-purpose central processing unit or an application-specific integrated circuit (ASIC), may be one or more integrated circuits configured to control program execution, may be a hardware circuit developed by using a field programmable gate array (FPGA), or may be a baseband processor.

Optionally, the processor 10 may include at least one processing core.

Optionally, the memory 40 may include one or more of a read-only memory (ROM), a random access memory (RAM), or a magnetic disk memory. The memory 40 is configured to store data and/or an instruction that are/is required when the processor 10 runs. There may be one or more memories 40.

Optionally, the transmitter 20 and the receiver 30 may be physically independent of each other, or may be physically integrated together. The transmitter 20 may send data by using an antenna. The receiver 30 may receive data by using an antenna.

Optionally, when the apparatus is the egress node, the apparatus may further include an egress port for packet output.

Optionally, when the apparatus is the ingress node, the apparatus may further include an ingress port for packet input.

Figure 3A:
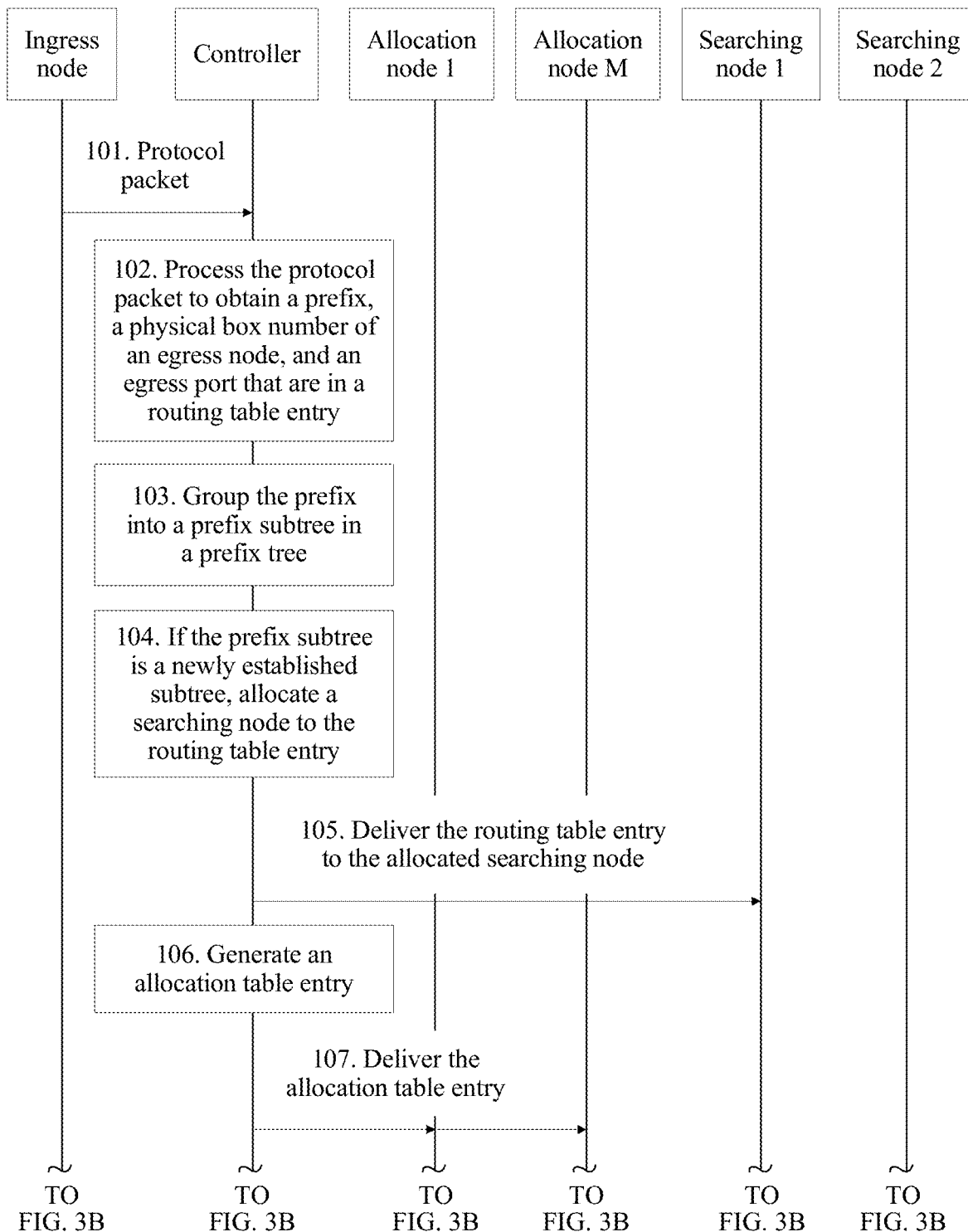
FIG. 3A and FIG. 3B are a flowchart of a method for configuring a routing table entry according to an embodiment of the present invention.
Figure 3B:
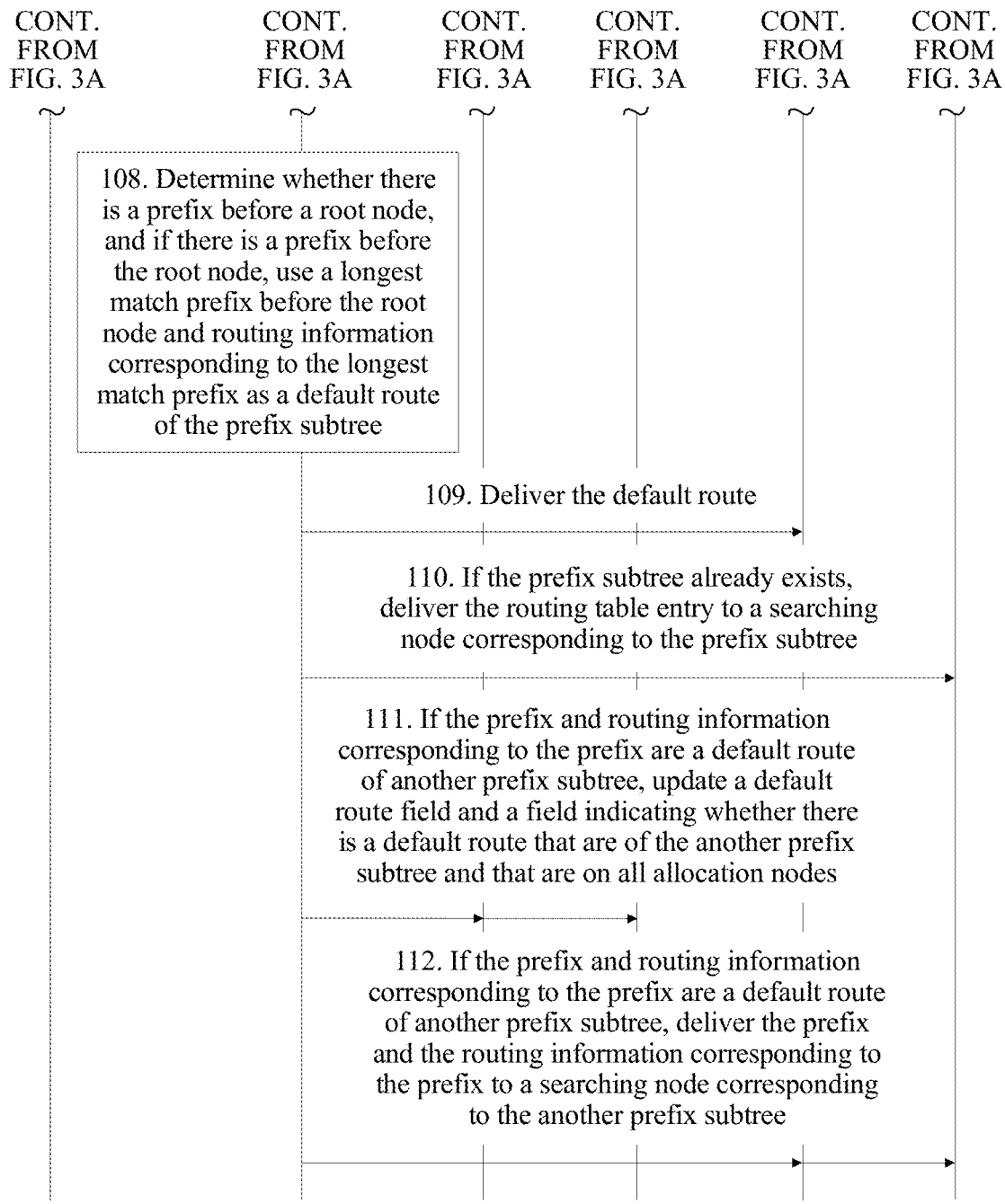

Referring to FIG. 3A and FIG. 3B, FIG. 3A and FIG. 3B are a flowchart of a method for configuring a routing table entry according to an embodiment of the present invention. As shown in FIG. 3A and FIG. 3B, the method includes the following steps.

Step 101: A controller receives a protocol packet sent by an ingress node. For example, after receiving a packet, the ingress node finds, by means of identification, that the packet is a protocol packet, and reports the protocol packet to the controller.

Step 102: The controller processes the protocol packet to obtain a prefix, a physical box number of an egress node, and an egress port that are in a routing table entry.

In actual application, the controller may process the protocol packet to obtain the routing table entry in a plurality of implementations. For example, if the protocol packet is a Border Gateway Protocol (BGP) packet, the protocol packet provides routing information indicating that a data packet arrives at a prefix, and the controller directly uses the prefix and the routing information as the routing table entry. For another example, if the protocol packet is an open shortest path first (OSPF) protocol packet, the protocol packet includes a status of a link between a packet forwarding device and an adjacent device. After obtaining all link status information, the controller obtains a shortest path tree by means of calculation by using a shortest path first (SPF) algorithm. This tree provides information about a route to each network element.

It should be noted that, a specific implementation of this step may vary with a protocol packet. For an existing protocol packet, routing information obtaining is content well-known to a person skilled in the art. Therefore, details are not described herein.

In addition, in an actual example, the prefix may be represented by a ternary bit string formed by "0", "1", and "*".

In a possible example, the routing table entry includes a prefix field and an egress port field. For example, the prefix field and the egress port field are shown in Table 1.

TABLE 1

| Prefix | Egress port field |
| --- | --- |
| 0000* | 31-02 |

In the example of Table 1, it is assumed that the prefix obtained in step 102 is 0000*, and content of the egress port field is 31-02, which indicates that the physical box number of the egress node is 31, and an egress port number is 02. The routing table entry indicates that a packet matching the prefix 0000* needs to be forwarded from an egress port that is corresponding to the egress port number 02 and that is of the egress node whose physical box number is 31.

In the example of Table 1, it is assumed that the prefix obtained in step 102 is 0000*, and the content of the egress port field is 31-02, which indicates that the physical box number of the egress node is 31, and an egress port number is 02. The routing table entry indicates that a packet matching the prefix 0000* needs to be forwarded from an egress port that is corresponding to the egress port number 02 and that is of the egress node whose physical box number is 31.

Figure 4A:
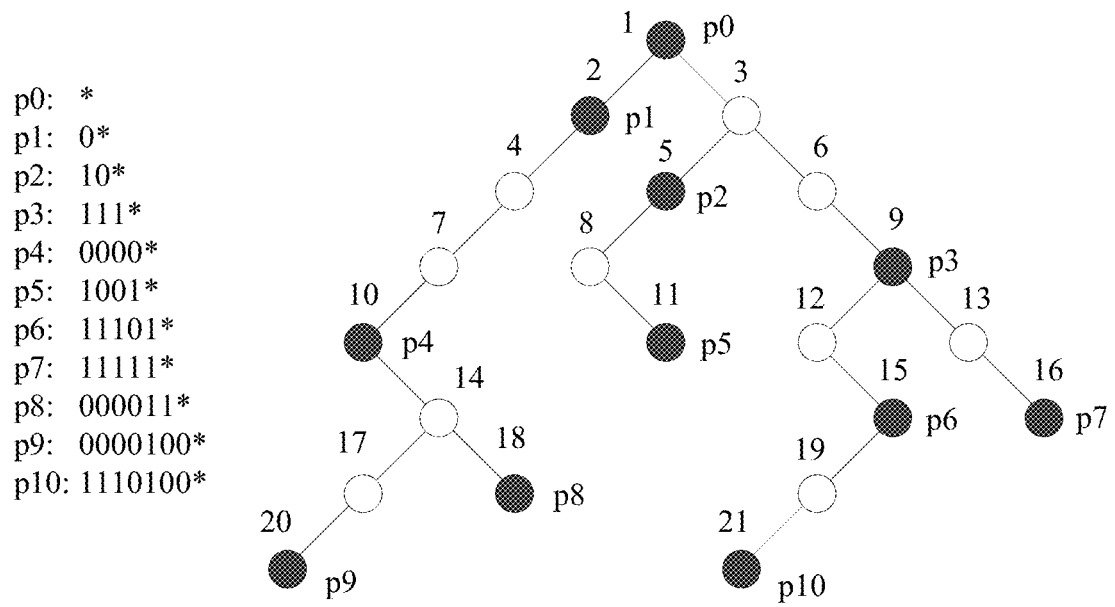
FIG. 4a to FIG. 4c are schematic diagrams of a prefix subtree according to an embodiment of the present invention.

Step 103: Group the prefix into a prefix subtree in a prefix tree (Trie). The prefix tree may be a binary tree, or may be a multi-way tree. The prefix tree is a binary tree or a multi-way tree established according to a bit string in a prefix. If one bit is considered each time, a binary tree is established, and the binary tree is also referred to as a single-bit trie tree. FIG. 4a shows a single-bit prefix tree. The prefix tree includes 11 proper prefixes, that is, p0 to p10 on the left of FIG. 4a. In the single-bit trie tree, corresponding nodes of the proper prefixes are represented by black circles, and a connection point is represented by a white circle. If a plurality of bits are considered each time, a multi-bit trie tree is established. A quantity of bits that is considered each time is usually fixed and is referred to as a stride (English: stride) of a trie tree.

The multi-bit trie tree may be obtained after a single-bit trie tree is divided into a plurality of subtrees according to a stride and a trie node is created for each subtree. Each trie node has an associated prefix, and the associated prefix of the trie node is a prefix value on a root node of a subtree corresponding to the trie node.

Figure 4B:
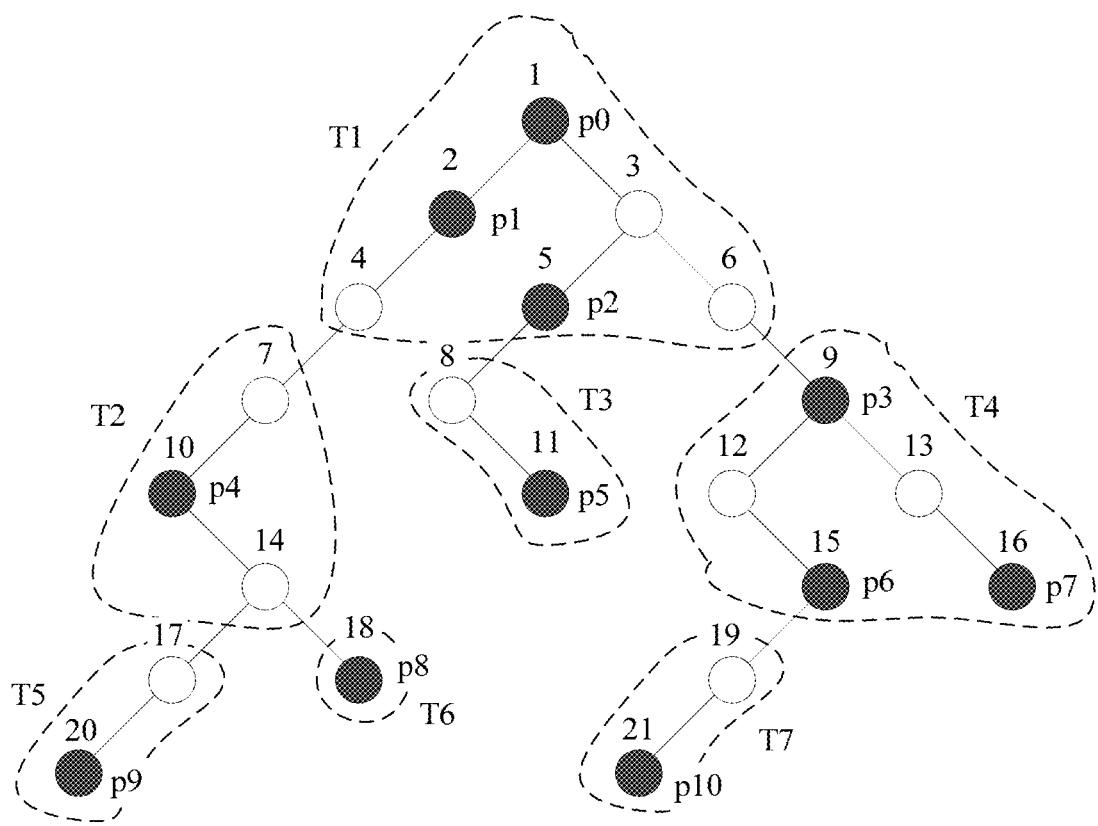

FIG. 4b shows a multi-bit trie tree that is established based on the prefixes in FIG. 4a and whose stride is equal to 3. The multi-bit trie tree includes seven trie nodes, that is, a trie node T1 to a trie node T7 shown in FIG. 4b. Each trie node is a prefix subtree. Each prefix subtree includes at least one proper prefix. Each trie node is provided with a prefix node. For example, a prefix corresponding to a root node of a prefix subtree T1 is p0, a prefix corresponding to a root node of a prefix subtree T2 is 000*, and the prefix corresponding to the root node of the prefix subtree T2 is not a proper prefix.

The following describes another possible method for obtaining a prefix subtree by means of grouping, and the method includes the following steps:

Step 1: Select any leaf node in a prefix tree as a current processing node N0, and a quantity of prefixes is initialized as 0.

Step 2: If a parent node of N0 has a prefix, the foregoing quantity is increased to a quantity of prefixes of the parent node.

Step 3: Determine whether N0 has a brother node; if N0 has a brother node, consider the brother node as N1; and if N0 has no brother node, perform step 7.

Step 4: If N1 has a prefix, the quantity of prefixes is increased by a quantity of prefixes of N1.

Step 5: Determine whether N1 has a child node, and if N1 has a child node, consider the child node as N1 and perform steps 4 to 6.

Step 6: Determine whether N1 has a brother node that is not traversed, and if N has a brother node that is not traversed, consider the brother node as N1 and perform steps 4 to 6.

Step 7: Consider the parent node as N0, and perform steps 2 to 7.

Optionally, in a process of accumulating a quantity of prefixes in the foregoing steps, if the quantity of prefixes exceeds a threshold, iteration is terminated, traversed nodes are considered as a subtree, and these nodes are removed from an original tree.

Figure 4C:
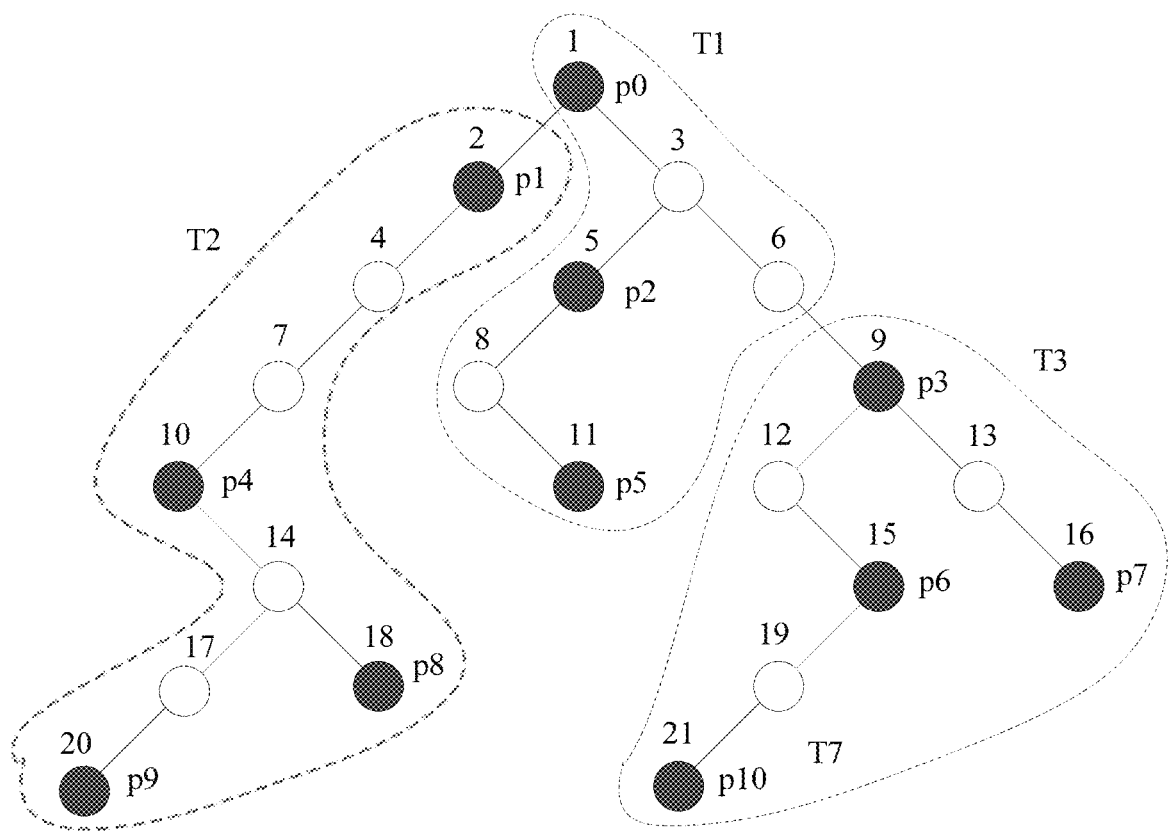

For example, referring to FIG. 4c, a process of obtaining the prefix subtree T2 by means of grouping is described below. A threshold of a quantity of prefixes of the subtree is 4.

1. Iteration is started from a leaf node 20 that includes a prefix p9, and a quantity of prefixes is initialized as 1.

2. A parent node 17 of p9 has no prefix, and p9 has no brother node.

3. A parent node 14 of the node 17 has no prefix, but a brother node 18 of the node 17 has a prefix p8, and the quantity of prefixes is increased by 1 and becomes 2.

4. The node 18 has no child node, and then traverse continues to be performed upwards to a parent node 10 of the node 14; the node 10 has a prefix p4, and the quantity of prefixes is 3.

5. Traverse is performed upwards from the node 10, and no parent node or brother node includes a prefix before a node 2; the node 2 includes a prefix p1, and the quantity of prefixes is 4.

6. In this case, the quantity of prefixes reaches the prefix threshold 4, the traversed nodes 2, 4, 7, 10, 14, 17, 18, and 20 form the subtree T2 that includes the prefixes p1, p4, p8, and p9, and these nodes are removed from an original tree.

For another example, referring to FIG. 4c, a process of obtaining a prefix subtree T3 by means of grouping is described below. A threshold of a quantity of prefixes of the subtree is 4.

1. Traverse is started from a leaf node 16 that includes a prefix p7, and a quantity of prefixes is initialized as 1.

2. A parent node 13 has no prefix, and the node 16 has no brother node.

3. A parent node 9 of the node 13 includes a prefix p3, and the quantity of prefixes becomes 2.

4. A brother node 12 of the node 13 has no prefix, but has a child node 15 that includes a prefix p6, and the quantity of prefixes becomes 3.

5. The node 15 has a child node 19 that has no prefix, the node 19 has a child node 21 that includes a prefix p10, and the quantity of prefixes becomes 4.

6. In this case, the quantity of prefixes reaches the prefix threshold 4, the traversed nodes 9, 12, 13, 15, 16, 19, and 21 form the subtree T3 that includes the prefixes p3, p6, p7, and p10, and these nodes are removed from an original tree.

It should be noted that the prefix subtree may be obtained in advance by means of grouping according to a rule. When the prefix in the routing table entry is obtained in step 102, the prefix is grouped into a prefix subtree, that is, a prefix subtree in which the prefix is located is determined, for example, it is determined that the prefix is located in the prefix subtree T2. Then, it is determined whether an allocation table entry (shown in Table 2 or Table 3) has been delivered to an allocation node for the prefix subtree T2. If the allocation table entry has been delivered to the allocation node for the prefix subtree T2, it indicates that the prefix subtree T2 is a prefix subtree that already exists, and therefore the allocation table entry does not need to be delivered again. If the allocation table entry has not been delivered for the prefix subtree T2, it indicates that the prefix subtree T2 is a newly established subtree, and the allocation table entry needs to be delivered. Therefore, step 104 to step 106 are performed.

Step 104: If the prefix subtree is a newly established subtree, allocate a searching node to the routing table entry obtained in step 102.

Generally, all proper prefixes in each subtree are stored in a same searching node. When a quantity of searching nodes is greater than 1, each searching node may store all proper prefixes of some prefix subtrees. In this way, each searching node only needs to maintain routing table entries of some proper prefixes. Therefore, fewer resources are consumed for routing table maintenance, and quick searching performed by the searching node is facilitated.

Therefore, in step 104, a searching node or a group of searching nodes need to be allocated to the routing table entry. If a group of searching nodes are allocated to the routing table entry, a searching node in the group of searching nodes is used as an active searching node, and remaining searching nodes may be used as standby searching nodes.

During allocation, a searching node that is to be allocated to the routing table entry may be determined according to a quantity of routing table entries stored on each searching node. For example, a searching node in all searching nodes that currently has fewest routing table entries is allocated to the routing table entry obtained in step 102.

Step 105: The controller delivers the routing table entry to the allocated searching node such as a searching node 1 in FIG. 3A and FIG. 3B.

Step 106: The controller generates an allocation table entry, and the allocation table entry includes a match field and a searching node number field. The match item field is a prefix corresponding to a root node of the prefix subtree, and the searching node number is a physical box number of the searching node.

In an example in which the prefix subtree is T4 and the prefix obtained in step 102 is p3, a format of the allocation table entry is shown in Table 2.

TABLE 2

| Match item | Searching node number |
|---|---|
| 111* | 10 |

In Table 2, the match item field is a prefix 111*corresponding to a root node of the prefix subtree T4 (shown in FIG. 4b), and the searching node number is a physical box number of the searching node 1, for example, the searching node number is 10.

In Table 2, the match item field is a prefix 111* corresponding to a root node of the prefix subtree T4 (shown in FIG. 4b), and the searching node number is a physical box number of the searching node 1, for example, the searching node number is 10.

Optionally, the allocation table entry further includes a field indicating whether there is a default route flag bit and a default route field, the field indicating whether there is a default route flag bit indicates whether the prefix subtree has a default route, the default route is a default route of the prefix subtree, and the default route is routing information corresponding to a longest match prefix (which is a proper prefix) before the root node. Details are shown in Table 3.

TABLE 3

| Match item | Whether there is a default route | Default route | Searching node number |
|---|---|---|---|
| 111* | Yes | *-20-03 | 10 |

In Table 3, because there is a longest match prefix *, that is, p0, before the root node of the prefix subtree T4, routing information corresponding to the longest match prefix is a default route of the prefix subtree. Therefore, "yes" is filled in the field indicating whether there is a default route, and "*20-03" is filled in the default route field. It indicates that the default route is as follows: A prefix field is *, and an egress port field is a physical box number 20 of an egress node and an egress port number 03 of the egress node.

In Table 3, because there is a longest match prefix *, that is, p0, before the root node of the prefix subtree T4, routing information corresponding to the longest match prefix is a default route of the prefix subtree. Therefore, "yes" is filled in the field indicating whether there is a default route, and "*-20-03" is filled in the default route field. It indicates that the default route is as follows: A prefix field is *, and an egress port field is a physical box number 20 of an egress node and an egress port number 03 of the egress node.

Step 107: Deliver the allocation table entry to all allocation nodes such as an allocation node 1 to an allocation node M in FIG. 3A and FIG. 3B. M is an integer greater than or equal to 1. When a quantity of allocation nodes is greater than 1, allocation nodes store a same allocation table entry.

Step 108: Determine whether there is a prefix before the root node, and if there is a prefix before the root node, the controller delivers, to the searching node, a longest match prefix (a proper prefix) before the root node and routing information corresponding to the longest match prefix that are used as a default route of the prefix subtree.

The default route has a same meaning as the foregoing description. However, a difference from the foregoing description lies in that step 109 is directly performed in this example, that is, the default route is directly delivered to the allocated searching node such as the searching node 1, and may be not filled in an allocation table entry. Therefore, a format of the allocation table entry may be shown in Table 2.

When receiving the default route, the searching node stores the default route in a routing table, and adds a new routing table entry.

Step 110: If the prefix subtree already exists, the controller delivers the routing table entry to a searching node corresponding to the prefix subtree, for example, a searching node 2 in FIG. 3A and FIG. 3B.

For example, the prefix obtained in step 102 is p6, and a prefix subtree allocated to the prefix p6 is T4. When a prefix p3 is grouped into a prefix subtree, the prefix subtree T4 is obtained. Therefore, when the prefix is p6, the prefix subtree already exists. That the prefix subtree already exists means that routing table entries corresponding to some proper prefixes in proper prefixes included in the prefix subtree have been stored on a searching node. Therefore, according to a principle that routing table entries corresponding to all proper prefixes included in a same prefix subtree are stored on a same searching node, there is no need to reallocate a searching node to a routing table entry of the prefix p6, but step 110 is directly performed, that is, the routing table entry corresponding to the prefix p6 is delivered to the searching node corresponding to the prefix subtree, for example, a searching node 1.

Step 111: If the prefix and routing information corresponding to the prefix are a default route of another subtree, the controller updates a default route field and a field indicating whether there is a default route that are of the another prefix subtree and that are on all the allocation nodes.

In the examples of FIG. 4a and FIG. 4b, assuming that the prefix p2 and routing information corresponding to the prefix p2 are a default route of a prefix subtree T3, the controller instructs all the allocation nodes to update the allocation table entry and modify a default route field and a field indicating whether there is a default route that are of the prefix subtree T3. For example, the modification is shown in Table 4.

TABLE 4

| Match item | Whether there is a default route | Default route | Searching node number |
|---|---|---|---|
| 100* | Yes | 10*-5-01 | 20 |

Optionally, if the prefix and routing information corresponding to the prefix are a default route of another prefix subtree, step 112 may be further performed, that is, the prefix and the routing information corresponding to the prefix are delivered to a searching node corresponding to the another prefix subtree. For example, assuming that the prefix p2 and routing information 15-01 corresponding to the prefix p2 are a default route of a prefix subtree T3, the controller delivers p2 and 15-01 to a searching node whose physical box number is 20. Correspondingly, the searching node respectively updates the prefix field and the egress port field of the routing table entry with p2 and 15-01 in the default route.

Correspondingly, the allocation node receives the allocation table entry delivered by the controller, and stores the newly received allocation table entry to form a new allocation table. The allocation table includes at least one allocation table entry described above. Similarly, the searching node receives the routing table entry delivered by the controller, and stores the newly received routing table entry to form a new routing table. The routing table includes at least one routing table entry described above.

Steps of configuring the routing table entry are basically completed.

Optionally, the controller may further maintain information about an established prefix subtree, and the information includes but is not limited to a prefix corresponding to a root node of the prefix subtree, all effective routing information in the prefix subtree, a default route of the prefix subtree, a correspondence between the prefix subtree and a searching node, and a relationship between the prefix subtree and an allocation table entry on an allocation node. Therefore, in the foregoing steps, the controller may find a searching node corresponding to a prefix subtree that already exists.

Figure 5:
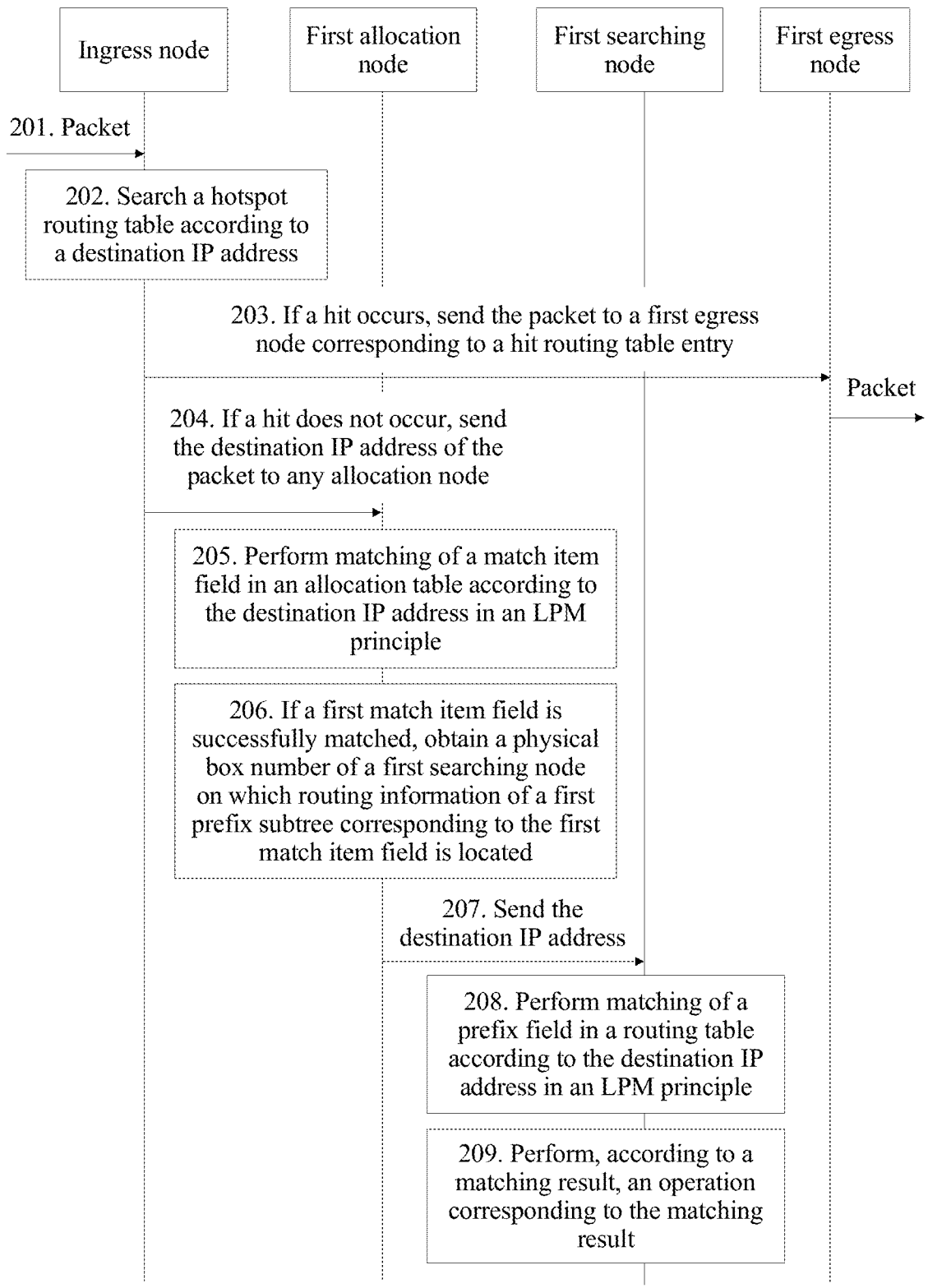
FIG. 5 is a flowchart of a route searching method according to an embodiment of the present invention.

The following describes a route searching method in the embodiments. The method may be applied to the packet forwarding device shown in FIG. 1a and FIG. 1b. As shown in FIG. 5, the method includes the following steps.

Step 201: An ingress node receives a packet. For example, the ingress node receives the packet from another network element such as a router. The packet usually includes a packet header, a packet text, verification code, and the like. The packet header may include a source IP address and a destination IP address.

Step 202: The ingress node searches a hotspot routing table according to a destination IP address. A routing table entry of the hotspot routing table and a routing table entry stored in the foregoing searching node may include a same field, for example, may include a prefix field and an egress port field. The prefix field is a proper prefix, and the egress port field is a physical box number of an egress node and an egress port number.

Optionally, a prefix in the hotspot routing table may be a frequently-used prefix determined by means of statistics collection, or may be determined by using another rule.

Optionally, the ingress node may perform searching in a longest prefix match (LPM) principle. The LPM principle is an algorithm that is in an IP protocol and that is used by the router to perform selection in the routing table.

Because each table entry in the routing table specifies a network, a destination IP address may match a plurality of table entries. A most specific table entry, that is, a table entry with a longest subnet mask, is referred to as a longest prefix match. A reason why the table entry is referred to as the longest prefix match is that the table entry is a table entry that is in the routing table and that matches most high-order bits of the destination IP address.

For example, the following IPv4 routing table is considered:

192.168.20.16/28; and
192.168.0.0/16.

When there is a need to search for an address 192.168.20.19, both the two table entries "match". That is, both the two table entries include the address to be searched for. In this case, a route with a longest prefix is 192.168.20.16/28. Because a subnet mask (/28) of this route is longer than a mask (/16) of another table entry, the route is more specific.

For example, the hotspot routing table is shown in Table 5.

TABLE 5

| Prefix | Egress port field |
|---|---|
| 0000* | 31-02 |
| 000011* | 40-02 |
| 1110100* | 50-01 |

During matching, an IP address may be translated into a binary bit value. Currently, the IP address is usually of 32 bits, that is, includes 32 bits. Then, LPM searching is performed on prefix match fields in Table 5, that is, matching is started from a most significant bit to a low-order bit. A prefix matching most high-order bits is a first prefix field. For example, the destination IP address is represented as 000011001 in binary, and then matching is performed in Table 5. A prefix 000011* is a successfully matched prefix. In this case, a first egress node is an egress node whose physical box number is 40, and an egress port is an egress port that is numbered 01 and that is of the first egress node. For another example, the destination IP address is represented as 111101101 in binary. When matching is performed in Table 5, there is no successfully matched table entry.

When the matching succeeds, that is, a hit occurs, the ingress node performs step 203, that is, sends the packet to a first egress node corresponding to a hit routing table entry.

If the hit does not occur, the ingress node performs step 204, that is, sends the IP address of the packet to any allocation node such as a first allocation node. The ingress node may consider load balancing, and sends the destination IP address of the packet to an allocation node whose workload is relatively low currently. Certainly, in actual application, the allocation node may be randomly allocated, or may be allocated in turn.

It should be noted that, step 202 is an optional step, that is, the ingress node may directly send the IP address to the first allocation node when receiving the packet. If step 202 is performed, by using the method, the packet may be quickly forwarded, and load of the allocation node and load of a searching node may be reduced.

In addition, in actual application, the ingress node may send the destination IP address of the packet to the first allocation node in a manner that includes but is not limited to the following two manners. In a first manner, the ingress node sends the entire packet to the first allocation node. The first allocation node may obtain the destination IP address by reading the packet header. This manner is applicable to the packet forwarding device shown in FIG. 1a.

Correspondingly, in step 207, the first allocation node sends the entire packet to a first searching node. The first searching node may obtain the destination IP address by reading the packet header.

Correspondingly, in step 209, the first searching node sends the entire packet to a first egress node.

In a second manner, before the ingress node sends the destination IP address to the first allocation node, the method further includes: The ingress node extracts the destination IP address of the packet; and the ingress node processes the destination IP address, an identifier (ID) of the packet, and a physical box number of the ingress node as a control message.

The ID of the packet is a unique identifier of the packet. The ID of the packet can not only be used to uniquely distinguish a packet from another, but also represent a storage address of the packet on the ingress node. Therefore, the ID of the packet may be the storage address of the packet on the ingress node, or may be an identifier that is of another type and that is uniquely corresponding to the storage address.

Optionally, in addition to the ID of the packet, the destination IP address, and the physical box number of the ingress node, the control message may further include a length of the packet, other service information, and a forwarding type. The other service information is other service information obtained on the ingress node, for example, whether unicast reverse path forwarding (URPF) is enabled, and whether an access control list (ACL) is enabled after route searching. The forwarding type is, for example, IPv4 unicast, IPv6 unicast, or the like.

A format of a possible control message is shown in Table 6.

TABLE 6

| ID of the packet | Length | Physical box number of the ingress node | Another service | Forwarding type | Destination IP address |
|---|---|---|---|---|---|
| A/packet | 20 bytes | 12 | URPF | IPv4 unicast | 192.168.20.16 |

In Table 6, because the packet header includes the destination IP address, a destination IP address field may be replaced with the packet header. In addition, the physical box number of the ingress node is a physical box number of an ingress node receiving the packet, for example, the physical box number of the ingress node is 12.

Correspondingly, that the ingress node sends the destination IP address of the packet to the first allocation node includes: The ingress node sends the control message to the first allocation node. After receiving the control message, the first allocation node may obtain the destination IP address of the packet by reading the destination IP address field in the control message.

The method is applicable to the packet forwarding device shown in FIG. 1b. By using the method, exchange congestion caused by distributed route searching may be relieved, interconnection load of a searching plane may be reduced, and pin occupation may be reduced.

When the ingress node sends the destination IP address of the packet to the first allocation node in the foregoing two manners or in another manner, the first allocation node performs step 205, that is, performs matching of a match item field in an allocation table according to the destination IP address in an LPM principle. An allocation table entry in the allocation table is, for example, shown in Table 2 and Table 3. The allocation table stored on the first allocation node is, for example, configured by using the method described in the embodiment of FIG. 3A and FIG. 3B with reference to FIG. 3A and FIG. 3B. Certainly, in actual application, the allocation table may be configured by using another method.

If a first match item is not successfully matched, the packet is directly discarded (corresponding to the first manner), or a searching procedure is terminated (corresponding to the second manner). If a first match item field is successfully matched, step 206 is performed, that is, the first allocation node obtains a physical box number of a first searching node on which routing information of a first prefix subtree corresponding to the first match item field is located (corresponding to the allocation table entry shown in Table 2). Corresponding to the allocation table entry shown in Table 3, the first allocation node further determines whether the first prefix subtree has a default route, and if a field indicating whether there is a default route is "yes", the first allocation node obtains a default route in a default route field.

It should be noted that, in actual application, the allocation table entry may further include a field indicating whether it is a local flag bit, and the field is used to indicate whether a physical box number of the first allocation node is the same as that of the first searching node. The first allocation node and the first searching node may be disposed in a same physical box. Therefore, if the physical box number of the first egress node in the allocation table entry is the same as the physical box number of the first allocation node, the field indicating whether it is a local flag bit may be set to 0 or 1, or may be expressed by "yes" or "no".

Next, step 207 is performed, that is, the first allocation node sends the destination IP address to a first searching node. Corresponding to the first manner, in step 207, the first allocation node sends the packet to the first searching node, and if there is a default route, the first allocation node further sends the default route to the first searching node. Specifically, the first allocation node may add the default route to the packet header.

Corresponding to the second manner, in step 207, the first allocation node may not need to send content of the packet, but send only the destination IP address or the packet header. Correspondingly, the first allocation node further sends the ID of the packet and the physical box number of the ingress node to the first searching node.

Step 208: The first searching node performs matching of a prefix field in a routing table according to the destination IP address in an LPM principle. A routing table entry of the routing table stored on the first searching node is, for example, the routing table entry shown in Table 1. The routing table stored on the first searching node is, for example, configured in the manner described in the embodiment of FIG. 3A and FIG. 3B with reference to FIG. 3A and FIG. 3B, or may be configured in another manner.

Afterwards, the first searching node performs step 209, that is, performs, according to a matching result, an operation corresponding to the matching result. In actual application, this step may be implemented in a plurality of manners, and details are described in the following.

Corresponding to the first manner, step 209 includes: If the matching result is that the destination IP address successfully matches a first prefix field in the routing table, the first searching node sends, to a first egress node corresponding to the first prefix field, the packet and a first egress port number corresponding to the first prefix field. The first egress node sends the packet by using the first egress port.

For example, assuming that the destination IP address matches the prefix 0000* in Table 1, the first searching node sends the packet and an egress port number 02 to an egress node whose physical box number is 31. Then, the egress node forwards the packet from an egress port corresponding to the egress port number 02.

Corresponding to the second manner, step 209 includes: If the matching result is that the destination IP address successfully matches a first prefix field in the routing table, the first searching node processes the ID, a physical box number of a first egress node corresponding to the first prefix field, and a first egress port as a first instruction message, and the first searching node sends the first instruction message to the ingress node. Correspondingly, the ingress node obtains the packet according to the ID, and sends the packet and the first egress port to the first egress node; then, the first egress node sends the packet by using the first egress port.

Optionally, the first instruction message may further include an editing instruction. The editing instruction is, for example, one or more of replacement, deletion, addition, discard, four rules of arithmetic, a bit operation, or a checksum.

For example, a new IP packet header is obtained after a forwarding service is performed on an IPv4 unicast packet in the previous step, and the editing instruction may be "replacement". An instruction parameter includes: a to-be-replaced location, that is, a location of the IP header in the packet, for example, a $14^{th}$ byte; a to-be-replaced length, that is, a length of the IP header, for example, 20 bytes; and replaced content, that is, the new IP packet header. Alternatively, the editing instruction may be "discard", that is, forwarding processing of the packet is terminated, and a cache on the ingress node is released.

After receiving the first instruction message, the ingress node may read data of the packet from a local cache according to the ID of the packet, edit the packet according to the editing instruction such as the "replacement" instruction, and replace the original IP packet header with a new IP header. After editing the packet, the ingress node sends the edited packet and the first egress port to the first egress node according to the physical box number of the first egress node in the first instruction message. Then, the first egress node forwards the edited packet by using the first egress port.

Optionally, corresponding to the second manner, step 209 includes: If the matching result is that the destination IP address successfully matches a first prefix field in the routing table, the first searching node processes the ID and a first egress port that is corresponding to the first prefix field as a second instruction message, and the first searching node sends the second instruction message and the physical box number of the ingress node to a first egress node corresponding to the first prefix field. Correspondingly, the first egress node sends a request message to the ingress node. The request message includes the ID. The ingress node obtains the packet according to the ID, and sends the packet to the first egress node. The first egress node receives the packet, and sends the packet by using the first egress port.

Optionally, the second instruction message may further include an editing instruction. A difference from the previous embodiment lies in that the egress node edits the packet according to the editing instruction and forwards the edited packet by using the first egress port.

Optionally, corresponding to the second manner, step 209 includes: If the matching result is that the destination IP address does not successfully match a first prefix field in the routing table, the first searching node processes the ID of the packet and an editing instruction as a third instruction message, and sends the third instruction message to the ingress node, where an editing instruction field is a discard instruction. After receiving the third instruction message, the ingress node may obtain the packet according to the ID of the packet, and discard the packet, to release storage space occupied by the packet.

Regardless of the first manner or the second manner, if the allocation table entry further includes a field indicating whether there is a default route flag bit and a default route field as shown in Table 3, the first searching node further receives a first flag bit that indicates whether there is a default route, that is corresponding to the first prefix subtree, and that is sent by the first allocation node. When the first flag bit that indicates whether there is a default route is yes, the first searching node receives a first default route that is of the first prefix subtree and that is sent by the first allocation node. Correspondingly, step 209 includes: If the matching result is that the destination IP address does not successfully match a first prefix field in the routing table, the first searching node determines whether the first flag bit that indicates whether there is a default route is yes; if the first flag bit that indicates whether there is a default route is yes, the first searching node obtains the first default route; and the first searching node obtains a second egress port and a physical box number of a second egress node corresponding to the first default route.

In addition, when the controller directly delivers the default route to the searching node, the searching node has updated the routing table with the default route. Therefore, the searching node directly performs matching in the routing table by using the destination IP address. This is the same as the method used when there is no default route. Details are not described herein again.

It can be learned from the foregoing description that, in the solutions in this embodiment of the present invention, routing tables are stored on different searching nodes in a distributed manner. Therefore, the routing tables may be distributed more evenly, and pressure of a single node from a routing table specification may be reduced. Further, both the allocation node and the searching node use the LPM matching principle during matching. Therefore, when the searching node is allocated, no conflict occurs, and no fault hit occurs. Therefore, entire route searching efficiency is relatively high.

Based on a same inventive concept, an embodiment of the present invention further provides an apparatus (shown in FIG. 2). The apparatus is configured to implement any one of the foregoing methods.

Optionally, when the apparatus is an allocation node, the apparatus includes a processor 10, a transmitter 20, and a receiver 30. The receiver 30 is configured to receive a destination internet protocol IP address of a packet sent by an ingress node of a packet forwarding device. The allocation node stores an allocation table, an allocation table entry of the allocation table includes a match item field and a searching node number field, the match item field is a prefix corresponding to a root node of a prefix subtree, and the searching node number field is a physical box number of a searching node on which routing information of the prefix subtree is located. The processor 10 is configured to: perform matching of the match item field in the allocation table according to the destination IP address in a longest prefix match LPM principle, and if the destination IP address successfully matches a first match item field in the allocation table, obtain, by the allocation node, a physical box number of a first searching node on which routing information of a first prefix subtree corresponding to the first match item field is located. The first searching node is a searching node of the packet forwarding device. The transmitter 20 is configured to send the destination IP address to the first searching node. The first searching node stores a routing table, a routing table entry of the routing table includes a prefix field and an egress port field, the prefix field is a proper prefix in the first prefix subtree, the egress port field is a physical box number of an egress node and an egress port number, and the egress node is an egress node of the packet forwarding device.

Optionally, the receiver 30 is configured to receive the packet sent by the ingress node.

Optionally, the receiver 30 is configured to receive a control message sent by the ingress node. The control message includes the destination IP address, an identifier ID of the packet, and a physical box number of the ingress node.

The transmitter 20 is further configured to send the ID and the physical box number of the ingress node to the first searching node.

Optionally, the allocation table entry of the allocation table further includes a field indicating whether there is a default route flag bit and a default route field, the field indicating whether there is a default route flag bit indicates whether the prefix subtree has a default route, the default route is a default route of the prefix subtree, and the default route is a longest match prefix before the root node and routing information corresponding to the longest match prefix.

The transmitter 20 is further configured to: if the destination IP address successfully matches the first match item field in the allocation table, send, to the first searching node, a first flag bit that indicates whether there is a default route and that is corresponding to the first match item field, and when the first flag bit that indicates whether there is a default route is yes, send, by the first allocation node to the first searching node, a first default route corresponding to the first match item field.

Optionally, the receiver 30 is further configured to receive an allocation table entry delivered by a controller of the packet forwarding device.

The processor 10 is further configured to update the allocation table according to the received allocation table entry.

Optionally, the allocation table entry of the allocation table further includes a field indicating whether there is a default route flag bit and a default route field, the field indicating whether there is a default route flag bit indicates whether the prefix subtree has a default route, the default route is a default route of the prefix subtree, and the default route is a longest match prefix before the root node and routing information corresponding to the longest match prefix. The receiver 30 is further configured to receive a default route delivered by a controller of the packet forwarding device. The delivered default route is a default route of the first prefix subtree. The processor 10 is further configured to: fill the delivered default route into a first default route field corresponding to the first match item field, and set, as yes, a first flag bit that indicates whether there is a default route and that is corresponding to the first match item field.

Optionally, when the apparatus in FIG. 2 is a searching node, the apparatus includes a processor 10, a transmitter 20, and a receiver 30. The receiver 30 is configured to receive a destination internet protocol IP address of a packet sent by an allocation node of a packet forwarding device. The allocation node stores an allocation table, an allocation table entry of the allocation table includes a match item field and a searching node number field, the match item field is a prefix corresponding to a root node of a prefix subtree, and the searching node number field is a physical box number of a searching node on which routing information of the prefix subtree is located. The searching node is a searching node on which routing information of a first prefix subtree in the prefix subtree is located. The searching node stores a routing table, a routing table entry of the routing table includes a prefix field and an egress port field, the prefix field is a prefix in the first prefix subtree, the egress port field is a physical box number of an egress node and an egress port number, and the egress node is an egress node of the packet forwarding device. The processor 10 is configured to: perform matching of the prefix field in the routing table according to the destination IP address in the LPM principle, and perform, according to a matching result, an operation corresponding to the matching result.

Optionally, the receiver 30 is configured to receive the packet sent by the allocation node. The processor 10 is configured to: if the matching result is that the destination IP address successfully matches a first prefix field in the routing table, send, by using the transmitter 20 to a first egress node corresponding to the first prefix field, the packet and a first egress port number corresponding to the first prefix field.

Optionally, the receiver 30 is further configured to receive an identifier ID of the packet sent by the allocation node and a physical box number of an ingress node of the packet forwarding device. The ingress node is an ingress node by using which the packet is received from an external network. The processor 10 is configured to: if the matching result is that the destination IP address successfully matches a first prefix field in the routing table, process the ID, a physical box number of a first egress node corresponding to the first prefix field, and a first egress port as a first instruction message, and send the first instruction message to the ingress node by using the transmitter 20.

Optionally, the first instruction message further includes an editing instruction, and the editing instruction is used to instruct the ingress node to edit the packet.

Optionally, the receiver 30 is further configured to receive an identifier ID of the packet sent by the allocation node and a physical box number of an ingress node of the packet forwarding device. The ingress node is an ingress node by using which the packet is received from an external network. The processor 10 is further configured to: if the matching result is that the destination IP address successfully matches a first prefix field in the routing table, process the ID and a first egress port that is corresponding to the first prefix field as a second instruction message, and send, by using the transmitter 20, the second instruction message and the physical box number of the ingress node to a first egress node corresponding to the first prefix field.

Optionally, the second instruction message further includes an editing instruction, and the editing instruction is used to instruct the ingress node to edit the packet.

Optionally, the allocation table entry of the allocation table further includes a field indicating whether there is a default route flag bit and a default route field, the field indicating whether there is a default route flag bit indicates whether the prefix subtree has a default route, the default route is a default route of the prefix subtree, and the default route is a longest match prefix before the root node and routing information corresponding to the longest match prefix. The receiver 30 is further configured to: receive a first flag bit that indicates whether there is a default route, that is corresponding to the first prefix subtree, and that is sent by the first allocation node, and when the first flag bit that indicates whether there is a default route is yes, receive, by the first searching node, a first default route that is of the first prefix subtree and that is sent by the first allocation node. The processor 10 is configured to: if the matching result is that the destination IP address does not successfully match a first prefix field in the routing table, determine whether the first flag bit that indicates whether there is a default route is yes; if the first flag bit that indicates whether there is a default route is yes, obtain the first default route; and obtain a second egress port and a physical box number of a second egress node corresponding to the first default route.

Optionally, the receiver 30 is further configured to receive a routing table entry sent by a controller of the packet forwarding device.

The processor 10 is further configured to update the routing table according to the received routing table entry.

Optionally, the receiver 30 is further configured to receive a default route that is of the first prefix subtree and that is delivered by a controller of the packet forwarding device. The default route is a longest match prefix before a root node of the first prefix subtree and routing information corresponding to the longest match prefix. The processor 10 is further configured to update the routing table with the default route of the first prefix subtree.

Optionally, the apparatus in FIG. 2 may be an ingress node, and the apparatus includes a processor 10, a transmitter 20, and a receiver 30. In this case, the receiver 30 is configured to receive a packet. The processor 10 is configured to process an identifier ID of the packet, a destination internet protocol IP address of the packet, and a physical box number of the ingress node as a control message. The transmitter 20 is configured to send the control message to a first allocation node in at least one allocation node of a packet forwarding device. The at least one allocation node stores a same allocation table, an allocation table entry of the allocation table includes a match item field and a searching node number field, the match item field is a prefix corresponding to a root node of a prefix subtree, and the searching node number field is a physical box number of a searching node on which routing information of the prefix subtree is located. The receiver 30 is further configured to receive a first instruction message sent by a first searching node in at least one searching node of the packet forwarding device. The first instruction message includes the ID, a physical box number of a first egress node, and a first egress port. The first searching node is a searching node on which routing information of a first prefix subtree in the prefix subtree is located. The first searching node stores a routing table, a routing table entry of the routing table includes a prefix field and an egress port field, the prefix field is a prefix in the first prefix subtree, and the egress port field is a physical box number of an egress node and an egress port number. The processor 10 further obtains the packet according to the ID, and sends the packet and the first egress port to the first egress node.

Optionally, the processor 10 is further configured to store the packet. The ID represents a storage address of the packet.

Optionally, the processor 10 is further configured to: before the control message is sent to the first allocation node in the at least one allocation node of the packet forwarding device, perform matching in a hotspot routing table according to the destination IP address, and determine that the matching does not succeed. A routing table entry of the hotspot routing table includes a prefix field and an egress port field, and the egress port field includes a physical box number of an egress node and an egress port.

Optionally, the first instruction message further includes an editing instruction. The processor 10 is further configured to: before the packet is sent to the first egress node, edit the packet according to the editing instruction.

Figure 6:
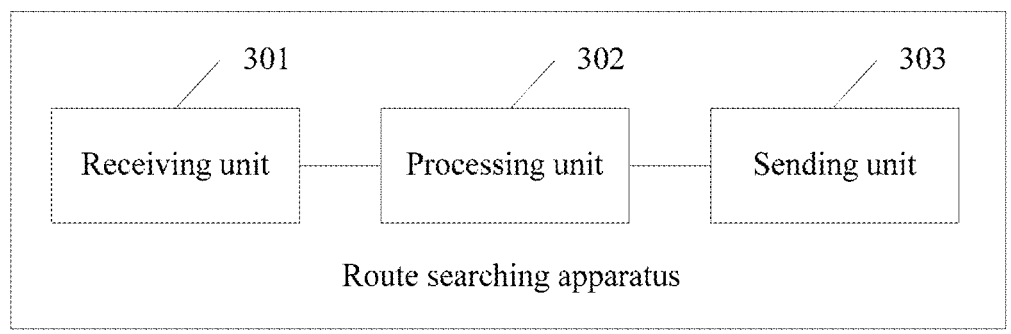
FIG. 6 is a functional block diagram of a route searching apparatus according to an embodiment of the present invention.

Based on a same inventive concept, an embodiment of the present invention further provides a route searching apparatus. The route searching apparatus includes function modules configured to perform the foregoing method steps. In a possible implementation, as shown in FIG. 6, the route searching apparatus includes a receiving unit 301, a processing unit 302, and a sending unit 303.

When the route searching apparatus is an allocation node, the receiving unit 301 is configured to receive a destination internet protocol IP address of a packet sent by an ingress node of a packet forwarding device. The route searching apparatus stores an allocation table, an allocation table entry of the allocation table includes a match item field and a searching node number field, the match item field is a prefix corresponding to a root node of a prefix subtree, and the searching node number field is a physical box number of a searching node on which routing information of the prefix subtree is located. The processing unit 302 is configured to: perform matching of the match item field in the allocation table according to the destination IP address in a longest prefix match LPM principle, and if the destination IP address successfully matches a first match item field in the allocation table, obtain, by the allocation node, a physical box number of a first searching node on which routing information of a first prefix subtree corresponding to the first match item field is located. The first searching node is a searching node of the packet forwarding device. The sending unit 303 is configured to send the destination IP address to the first searching node. The first searching node stores a routing table, a routing table entry of the routing table includes a prefix field and an egress port field, the prefix field is a proper prefix in the first prefix subtree, the egress port field is a physical box number of an egress node and an egress port number, and the egress node is an egress node of the packet forwarding device.

Optionally, the receiving unit 301 is configured to receive the packet sent by the ingress node.

Optionally, the receiving unit 301 is configured to receive a control message sent by the ingress node. The control message includes the destination IP address, an identifier ID of the packet, and a physical box number of the ingress node. The sending unit 303 is further configured to send the ID and the physical box number of the ingress node to the first searching node.

Optionally, the allocation table entry of the allocation table further includes a field indicating whether there is a default route flag bit and a default route field, the field indicating whether there is a default route flag bit indicates whether the prefix subtree has a default route, the default route is a default route of the prefix subtree, and the default route is a longest match prefix before the root node and routing information corresponding to the longest match prefix. The sending unit 303 is further configured to: if the destination IP address successfully matches the first match item field in the allocation table, send, to the first searching node, a first flag bit that indicates whether there is a default route and that is corresponding to the first match item field, and when the first flag bit that indicates whether there is a default route is yes, send, by the first allocation node to the first searching node, a first default route corresponding to the first match item field.

Optionally, the receiving unit 301 is further configured to receive an allocation table entry delivered by a controller of the packet forwarding device. The processing unit 302 is further configured to update the allocation table according to the received allocation table entry.

Optionally, the allocation table entry of the allocation table further includes a field indicating whether there is a default route flag bit and a default route field, the field indicating whether there is a default route flag bit indicates whether the prefix subtree has a default route, the default route is a default route of the prefix subtree, and the default route is a longest match prefix before the root node and routing information corresponding to the longest match prefix. The receiving unit 301 is further configured to receive a default route delivered by a controller of the packet forwarding device. The delivered default route is a default route of the first prefix subtree. The processing unit 302 is further configured to: fill the delivered default route into a first default route field corresponding to the first match item field, and set, as yes, a first flag bit that indicates whether there is a default route and that is corresponding to the first match item field.

Optionally, when the apparatus in FIG. 6 is a searching node, the receiving unit 301 is configured to receive a destination internet protocol IP address of a packet sent by an allocation node of a packet forwarding device. The allocation node stores an allocation table, an allocation table entry of the allocation table includes a match item field and a searching node number field, the match item field is a prefix corresponding to a root node of a prefix subtree, and the searching node number field is a physical box number of a searching node on which routing information of the prefix subtree is located. The route searching apparatus is a searching node on which routing information of a first prefix subtree in the prefix subtree is located. The route searching apparatus stores a routing table, a routing table entry of the routing table includes a prefix field and an egress port field, the prefix field is a prefix in the first prefix subtree, the egress port field is a physical box number of an egress node and an egress port number, and the egress node is an egress node of the packet forwarding device. The processing unit 302 is configured to: perform matching of the prefix field in the routing table according to the destination IP address in the LPM principle, and perform, according to a matching result, an operation corresponding to the matching result.

Optionally, the receiving unit 301 is configured to receive the packet sent by the allocation node. The processing unit 302 is configured to: if the matching result is that the destination IP address successfully matches a first prefix field in the routing table, send, by using the sending unit 303 to a first egress node corresponding to the first prefix field, the packet and a first egress port number corresponding to the first prefix field.

Optionally, the receiving unit 301 is further configured to receive an identifier ID of the packet sent by the allocation node and a physical box number of an ingress node of the packet forwarding device. The ingress node is an ingress node by using which the packet is received from an external network. The processing unit 302 is configured to: if the matching result is that the destination IP address successfully matches a first prefix field in the routing table, process the ID, a physical box number of a first egress node corresponding to the first prefix field, and a first egress port as a first instruction message, and send the first instruction message to the ingress node by using the sending unit 303.

Optionally, the first instruction message further includes an editing instruction, and the editing instruction is used to instruct the ingress node to edit the packet.

Optionally, the receiving unit 301 is further configured to receive an identifier ID of the packet sent by the allocation node and a physical box number of an ingress node of the packet forwarding device. The ingress node is an ingress node by using which the packet is received from an external network. The processing unit 302 is further configured to: if the matching result is that the destination IP address successfully matches a first prefix field in the routing table, process the ID and a first egress port that is corresponding to the first prefix field as a second instruction message, and send, by using the sending unit 303, the second instruction message and the physical box number of the ingress node to a first egress node corresponding to the first prefix field.

Optionally, the second instruction message further includes an editing instruction, and the editing instruction is used to instruct the ingress node to edit the packet.

Optionally, the allocation table entry of the allocation table further includes a field indicating whether there is a default route flag bit and a default route field, the field indicating whether there is a default route flag bit indicates whether the prefix subtree has a default route, the default route is a default route of the prefix subtree, and the default route is a longest match prefix before the root node and routing information corresponding to the longest match prefix. The receiving unit 301 is further configured to: receive a first flag bit that indicates whether there is a default route, that is corresponding to the first prefix subtree, and that is sent by the first allocation node, and when the first flag bit that indicates whether there is a default route is yes, receive, by the first searching node, a first default route that is of the first prefix subtree and that is sent by the first allocation node. The processing unit 302 is configured to: if the matching result is that the destination IP address does not successfully match a first prefix field in the routing table, determine whether the first flag bit that indicates whether there is a default route is yes; if the first flag bit that indicates whether there is a default route is yes, obtain the first default route; and obtain a second egress port and a physical box number of a second egress node corresponding to the first default route.

Optionally, the receiving unit 301 is further configured to receive a routing table entry sent by a controller of the packet forwarding device. The processing unit 302 is further configured to update the routing table according to the received routing table entry.

Optionally, the receiving unit 301 is further configured to receive a default route that is of the first prefix subtree and that is delivered by a controller of the packet forwarding device. The default route is a longest match prefix before a root node of the first prefix subtree and routing information corresponding to the longest match prefix. The processing unit 302 is further configured to update the routing table with the default route of the first prefix subtree.

Optionally, when the apparatus in FIG. 6 is an ingress node, the receiving unit 301 is configured to receive a packet. The processing unit 302 is configured to process an identifier ID of the packet, a destination internet protocol IP address of the packet, and a physical box number of the route searching apparatus as a control message. The sending unit 303 is configured to send the control message to a first allocation node in at least one allocation node of a packet forwarding device. The at least one allocation node stores a same allocation table, an allocation table entry of the allocation table includes a match item field and a searching node number field, the match item field is a prefix corresponding to a root node of a prefix subtree, and the searching node number field is a physical box number of a searching node on which routing information of the prefix subtree is located. The receiving unit 301 is further configured to receive a first instruction message sent by a first searching node in at least one searching node of the packet forwarding device. The first instruction message includes the ID, a physical box number of a first egress node, and a first egress port. The first searching node is a searching node on which routing information of a first prefix subtree in the prefix subtree is located. The first searching node stores a routing table, a routing table entry of the routing table includes a prefix field and an egress port field, the prefix field is a prefix in the first prefix subtree, and the egress port field is a physical box number of an egress node and an egress port number. The processing unit 302 further obtains the packet according to the ID, and sends the packet and the first egress port to the first egress node.

Optionally, the processing unit 302 is further configured to store the packet. The ID represents a storage address of the packet.

Optionally, the processing unit 302 is further configured to: before the control message is sent to the first allocation node in the at least one allocation node of the packet forwarding device, perform matching in a hotspot routing table according to the destination IP address, and determine that the matching does not succeed. A routing table entry of the hotspot routing table includes a prefix field and an egress port field, and the egress port field includes a physical box number of an egress node and an egress port.

Optionally, the first instruction message further includes an editing instruction. The processing unit 302 is further configured to: before the packet is sent to the first egress node, edit the packet according to the editing instruction.

Various variations and specific instances in the route searching method in the foregoing embodiment are also applied to the route searching apparatus in this embodiment and the apparatus in FIG. 2. According to the foregoing detailed descriptions of the route searching method, a person skilled in the art may clearly know implementation methods of the route searching apparatus in this embodiment and the apparatus in FIG. 2. Therefore, for brevity of this specification, details are not described herein again.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk memory, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may also be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A route searching method, comprising:
   receiving, by an allocation node of a packet forwarding device, a destination internet protocol (IP) address of a packet sent by an ingress node of the packet forwarding device, wherein the allocation node stores an allocation table, an allocation table entry of the allocation table comprises a match item field and a searching node number field, the match item field comprises a prefix corresponding to a root node of a prefix subtree, and the searching node number field comprises a physical box number of a searching node on which routing information of the prefix subtree is located;
   performing, by the allocation node, matching of the match item field in the allocation table according to the destination IP address in a longest prefix match (LPM) principle;
   in response to the destination IP address successfully matching a first match item field in the allocation table, obtaining, by the allocation node, a physical box number of a first searching node on which routing information of a first prefix subtree corresponding to the first match item field is located, wherein the first searching node is a searching node of the packet forwarding device; and
   sending, by the allocation node, the destination IP address to the first searching node, wherein the first searching node stores a routing table, a routing table entry of the routing table comprises a prefix field and an egress port field, the prefix field comprises a proper prefix in the first prefix subtree, the egress port field comprises a physical box number of an egress node of the packet forwarding device and an egress port number.

2. The method according to claim 1, wherein the receiving, by the allocation node, the destination IP address comprises:
   receiving, by the allocation node, the packet sent by the ingress node.

3. The method according to claim 1, wherein the receiving, by the allocation node, the destination IP address comprises:
   receiving, by the allocation node, a control message sent by the ingress node, wherein the control message comprises the destination IP address, an identifier (ID) of the packet, and a physical box number of the ingress node; and
   the method further comprises: sending, by the allocation node, the ID and the physical box number of the ingress node to the first searching node.

4. The method according to claim 1, wherein the allocation table entry of the allocation table further comprises a field indicating whether there is a default route flag bit and a default route field, the field indicating whether there is a default route flag bit indicates whether the prefix subtree has a default route, the default route is a default route of the prefix subtree, and the default route is a longest match prefix before the root node and routing information corresponding to the longest match prefix; and the method further comprises:
   in response to the destination IP address successfully matching the first match item field in the allocation table, sending, by the allocation node to the first searching node, a first flag bit that indicates whether there is a default route and that is corresponding to the first match item field; and
   when the first flag bit is set to yes, sending, by a first allocation node to the first searching node, a first default route corresponding to the first match item field.

5. The method according to claim 1, wherein the method further comprises:
- receiving, by the allocation node, an allocation table entry delivered by a controller of the packet forwarding device; and
- updating, by the allocation node, the allocation table according to the received allocation table entry.

6. The method according to claim 1, wherein the allocation table entry of the allocation table further comprises a field indicating whether there is a default route flag bit and a default route field, the field indicating whether there is a default route flag bit indicates whether the prefix subtree has a default route, the default route is a default route of the prefix subtree, and the default route is a longest match prefix before the root node and routing information corresponding to the longest match prefix; and the method further comprises:
- receiving, by the allocation node, a default route delivered by a controller of the packet forwarding device, wherein the delivered default route is a default route of the first prefix subtree;
- filling, by the allocation node, the delivered default route into a first default route field corresponding to the first match item field; and
- setting a first flag bit to yes, wherein the first flag bit indicates whether there is a default route and is corresponding to the first match item field.

7. A route searching method, comprising:
- receiving, by a first searching node of a packet forwarding device, a destination internet protocol (IP) address of a packet sent by an allocation node of the packet forwarding device, wherein the allocation node stores an allocation table, an allocation table entry of the allocation table comprises a match item field and a searching node number field, the match item field comprises a prefix corresponding to a root node of a prefix subtree, the searching node number field comprises a physical box number of a searching node on which routing information of the prefix subtree is located, the first searching node is a searching node on which routing information of a first prefix subtree in the prefix subtree is located, the first searching node stores a routing table, a routing table entry of the routing table comprises a prefix field and an egress port field, the prefix field comprises a prefix in the first prefix subtree, the egress port field comprises a physical box number of an egress node of the packet forwarding device and an egress port number;
- performing, by the first searching node, matching of the prefix field in the routing table according to the destination IP address on a longest prefix match (LPM) principle; and
- performing, by the first searching node according to a matching result, an operation corresponding to the matching result.

8. The method according to claim 7, wherein the receiving, by the first searching node, the destination IP address comprises:
- receiving, by the first searching node, the packet sent by the allocation node; and
- the performing, by the first searching node according to the matching result, the operation corresponding to the matching result comprises:
- in response to the matching result being that the destination IP address successfully matches a first prefix field in the routing table, sending, by the first searching node to a first egress node corresponding to the first prefix field, the packet and a first egress port number corresponding to the first prefix field.

9. The method according to claim 7, wherein the method further comprises:
- receiving, by the first searching node, an identifier (ID) of the packet sent by the allocation node and a physical box number of an ingress node of the packet forwarding device, wherein the packet is received from an external network by using the ingress node; and
- the performing, by the first searching node according to a matching result, an operation corresponding to the matching result comprises:
- in response to the matching result being that the destination IP address successfully matches a first prefix field in the routing table, processing, by the first searching node, the ID, a physical box number of a first egress node corresponding to the first prefix field, and a first egress port as a first instruction message; and
- sending, by the first searching node, the first instruction message to the ingress node.

10. The method according to claim 9, wherein the first instruction message further comprises an editing instruction, and the editing instruction instructs the ingress node to edit the packet.

11. The method according to claim 7, wherein the method further comprises:
- receiving, by the first searching node, an identifier (ID) of the packet sent by the allocation node and a physical box number of an ingress node of the packet forwarding device, wherein the packet is received from an external network by using the ingress node; and
- the performing, by the first searching node according to the matching result, the operation corresponding to the matching result comprises:
- in response to the matching result being that the destination IP address successfully matches a first prefix field in the routing table, processing, by the first searching node, the ID and a first egress port that is corresponding to the first prefix field as a second instruction message; and
- sending, by the first searching node, the second instruction message and the physical box number of the ingress node to a first egress node corresponding to the first prefix field.

12. The method according to claim 11, wherein the second instruction message further comprises an editing instruction, and the editing instruction instructs the first egress node to edit the packet.

13. The method according to claim 7, wherein the allocation table entry of the allocation table further comprises a field indicating whether there is a default route flag bit and a default route field, the field indicating whether there is a default route flag bit indicates whether the prefix subtree has a default route, the default route is a default route of the prefix subtree, and the default route is a longest match prefix before the root node and routing information corresponding to the longest match prefix; and the method further comprises:
- receiving, by the first searching node, a first flag bit that indicates whether there is a default route that is corresponding to the first prefix subtree and that is sent by a first allocation node; and
- when the first flag bit that indicates whether there is a default route is set to yes, receiving, by the first searching node, a first default route that is of the first prefix subtree and that is sent by the first allocation node; and the performing, by the first searching node according to the matching result, the operation corresponding to the matching result comprises:
in response to the matching result being that the destination IP address does not successfully match a first prefix field in the routing table, determining, by the first searching node, whether the first flag bit that indicates whether there is a default route is set to yes;
in response to the first flag bit that indicates whether there is a default route being set to yes, obtaining, by the first searching node, the first default route; and
obtaining, by the first searching node, a second egress port and a physical box number of a second egress node corresponding to the first default route.

14. The method according to claim 7, wherein the method further comprises:
receiving, by the first searching node, a routing table entry sent by a controller of the packet forwarding device; and
updating, by the first searching node, the routing table according to the received routing table entry.

15. The method according to claim 7, wherein the method further comprises:
receiving, by the first searching node, a default route that is of the first prefix subtree and that is delivered by a controller of the packet forwarding device, wherein the default route is a longest match prefix before a root node of the first prefix subtree and routing information corresponding to the longest match prefix; and
updating, by the first searching node, the routing table with the default route of the first prefix subtree.

16. An allocation node, comprising:
a receiver, configured to receive a destination internet protocol (IP) address of a packet sent by an ingress node of a packet forwarding device, wherein the allocation node stores an allocation table, an allocation table entry of the allocation table comprises a match item field and a searching node number field, the match item field comprises a prefix corresponding to a root node of a prefix subtree, and the searching node number field comprises a physical box number of a searching node on which routing information of the prefix subtree is located;
a non-transitory memory storage comprising instructions;
one or more hardware processors in communication with the non-transitory memory storage, wherein the one or more hardware processors execute the instructions to:
perform matching of the match item field in the allocation table according to the destination IP address in a longest prefix match (LPM) principle; and
in response to the destination IP address successfully matching a first match item field in the allocation table, obtain, by the allocation node, a physical box number of a first searching node on which routing information of a first prefix subtree corresponding to the first match item field is located, wherein the first searching node is a searching node of the packet forwarding device; and
a transmitter, configured to send the destination IP address to the first searching node, wherein the first searching node stores a routing table, a routing table entry of the routing table comprises a prefix field and an egress port field, the prefix field comprises a proper prefix in the first prefix subtree, the egress port field comprises a physical box number of an egress node of the packet forwarding device and an egress port number.

17. The allocation node according to claim 16, wherein the receiver is configured to receive a control message sent by the ingress node, wherein the control message comprises the destination IP address, an identifier (ID) of the packet, and a physical box number of the ingress node; and
the transmitter is further configured to send the ID and the physical box number of the ingress node to the first searching node.

18. The allocation node according to claim 16, wherein the allocation table entry of the allocation table further comprises a field indicating whether there is a default route flag bit and a default route field, the field indicating whether there is a default route flag bit indicates whether the prefix subtree has a default route, the default route is a default route of the prefix subtree, and the default route is a longest match prefix before the root node and routing information corresponding to the longest match prefix; and
the transmitter is further configured to:
in response to the destination IP address successfully matching the first match item field in the allocation table, send, to the first searching node, a first flag bit that indicates whether there is a default route and that is corresponding to the first match item field; and
when the first flag bit is set to yes, send, by a first allocation node to the first searching node, a first default route corresponding to the first match item field.

19. The allocation node according to claim 16, wherein the receiver is further configured to receive an allocation table entry delivered by a controller of the packet forwarding device; and
the one or more hardware processors further execute the instructions to update the allocation table according to the received allocation table entry.

20. The allocation node according to claim 16, wherein the allocation table entry of the allocation table further comprises a field indicating whether there is a default route flag bit and a default route field, the field indicating whether there is a default route flag bit indicates whether the prefix subtree has a default route, the default route is a default route of the prefix subtree, and the default route is a longest match prefix before the root node and routing information corresponding to the longest match prefix;
the receiver is further configured to receive a default route delivered by a controller of the packet forwarding device, wherein the delivered default route is a default route of the first prefix subtree; and
the one or more hardware processors further execute the instructions to:
fill the delivered default route into a first default route field corresponding to the first match item field; and
set a first flag bit to yes, wherein the first flag bit indicates whether there is a default route and is corresponding to the first match item field.

* * * * *